(12) United States Patent
Mori et al.

(10) Patent No.: US 7,515,040 B2
(45) Date of Patent: Apr. 7, 2009

(54) WHEEL IDENTIFYING APPARATUS AND TIRE INFLATION PRESSURE DETECTING APPARATUS WITH FUNCTION OF WHEEL IDENTIFICATION

(75) Inventors: Masashi Mori, Oobu (JP); Ryozo Okumura, Kariya (JP); Hideki Saito, Anjo (JP); Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 229 days.

(21) Appl. No.: 11/481,061

(22) Filed: Jul. 6, 2006

(65) Prior Publication Data

US 2007/0008097 A1    Jan. 11, 2007

(30) Foreign Application Priority Data

Jul. 6, 2005    (JP)    ............................. 2005-197497
Jul. 7, 2005    (JP)    ............................. 2005-198703

(51) Int. Cl.
    B60C 23/00    (2006.01)
(52) U.S. Cl. ..................... 340/442; 340/445; 340/443; 340/505; 340/572.1; 340/10.1; 340/10.4; 73/146.5
(58) Field of Classification Search ............... 340/506, 340/442, 443, 447, 445, 505, 10.34, 572.1, 340/572.4, 10.1, 10.3, 10.4, 10.42; 73/146.5
    See application file for complete search history.

(56) References Cited

U.S. PATENT DOCUMENTS

| | | | |
|---|---|---|---|
| 4,911,217 A * | 3/1990 | Dunn et al. | ............... 152/152.1 |
| 5,181,975 A * | 1/1993 | Pollack et al. | ............ 152/152.1 |
| 5,602,524 A | 2/1997 | Mock et al. | |
| 6,218,936 B1 | 4/2001 | Imao | |
| 6,310,926 B1 * | 10/2001 | Tore | ............................ 375/355 |

(Continued)

FOREIGN PATENT DOCUMENTS

CN    1496867    5/2004

(Continued)

OTHER PUBLICATIONS

Korean Notice of Invitation to Submit Opinion dated Feb. 26, 2008 issued in counterpart Korean Application 10-2006-0063188 with English translation.

(Continued)

Primary Examiner—Daryl C Pope
(74) Attorney, Agent, or Firm—Nixon & Vanderhye PC

(57) ABSTRACT

A wheel identifying apparatus according to the present invention includes a plurality of transceivers, a triggering device, a receiver, and a wheel identifier. Each of the transceivers is located on one of a plurality of wheels of a vehicle and works to receive a trigger signal and transmit a response signal in response to receipt of the trigger signal. The triggering device is located on a body of the vehicle at different distances from the transceivers and works to transmit the trigger signal. The receiver works to receive the response signals transmitted by the transceivers. The wheel identifier is operatively connected to the receiver and works to identify, for each of the response signals received by the receiver, the wheel on which the transceiver having transmitted the response signal is located using the fact that strengths of the trigger signal at the transceivers are different from each other.

35 Claims, 18 Drawing Sheets

U.S. PATENT DOCUMENTS

| | | | |
|---|---|---|---|
| 6,369,712 B2 * | 4/2002 | Letkomiller et al. | 340/572.1 |
| 6,549,561 B2 * | 4/2003 | Crawford | 375/137 |
| 6,630,885 B2 * | 10/2003 | Hardman et al. | 340/505 |
| 6,633,616 B2 * | 10/2003 | Crawford | 375/326 |
| 6,879,252 B2 | 4/2005 | DeZorzi et al. | |
| 6,885,293 B2 | 4/2005 | Okumura | |
| 6,885,296 B2 * | 4/2005 | Hardman et al. | 340/505 |
| 6,963,274 B2 | 11/2005 | Saheki et al. | |
| 6,985,432 B1 * | 1/2006 | Hadad | 370/203 |
| 7,023,928 B2 * | 4/2006 | Laroia et al. | 375/260 |
| 7,058,002 B1 * | 6/2006 | Kumagai et al. | 370/203 |
| 7,161,476 B2 * | 1/2007 | Hardman et al. | 340/442 |
| 7,245,677 B1 * | 7/2007 | Pare, Jr. | 375/344 |
| 2004/0230350 A1 | 11/2004 | Ogawa et al. | |
| 2005/0162259 A1 | 7/2005 | Hotta et al. | |
| 2005/0253696 A1 | 11/2005 | Mori et al. | |
| 2006/0139157 A1 | 6/2006 | Takao et al. | |

FOREIGN PATENT DOCUMENTS

| | | |
|---|---|---|
| JP | H05-013802 | 2/1993 |
| JP | 2000-062420 | 2/2000 |
| JP | 3212311 | 7/2001 |
| JP | 2003-237328 | 8/2003 |
| JP | 2004-362536 | 12/2004 |
| JP | 2005-207223 | 8/2005 |
| JP | 2005-350046 | 12/2005 |
| KR | 2004-0026621 | 3/2004 |
| WO | WO 03/086787 | 10/2003 |
| WO | WO 2004/067300 | 8/2004 |

OTHER PUBLICATIONS

Chinese Official Action dated Apr. 25, 2008, issued in counterpart Chinese Application No. 2006-10121402.2 with English translation.
Japanese Official Action dated May 13, 2008 issued in counterpart JP Application No. 2005-197497 with English translation.
Japanese Official Action dated May 13, 2008 issued in counterpart JP Application No. 2005-198703 with English translation.

* cited by examiner

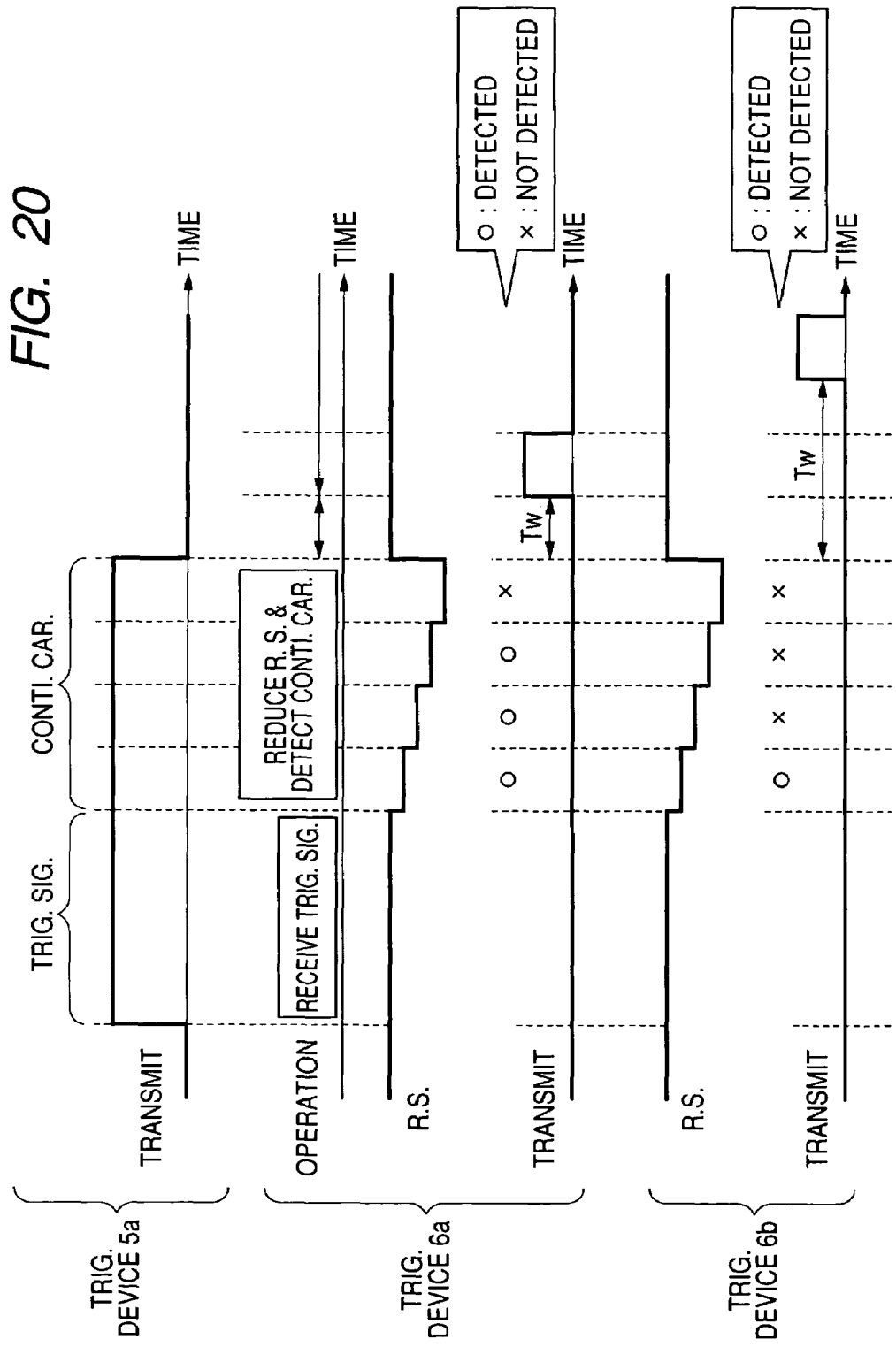

//  WHEEL IDENTIFYING APPARATUS AND TIRE INFLATION PRESSURE DETECTING APPARATUS WITH FUNCTION OF WHEEL IDENTIFICATION

CROSS-REFERENCE TO RELATED APPLICATION

This application is based on and claims priority from Japanese Patent Applications No. 2005-197497, filed on Jul. 6, 2005, and No. 2005-198703, filed on Jul. 7, 2005, the contents of which are hereby incorporated by reference into this application.

BACKGROUND OF THE INVENTION

1. Technical Field of the Invention

The present invention relates generally to tire inflation pressure detecting apparatuses for detecting the inflation pressure of tires on a vehicle and tire location detecting apparatuses for automatically detecting the locations of tires on a vehicle.

More particularly, the invention relates to a direct-type tire inflation pressure detecting apparatus which has a function of wheel identification.

2. Description of the Related Art

Conventional direct-type tire inflation pressure detecting apparatuses generally include a plurality of transmitters and a receiver.

Each of the transmitters is directly mounted on one of a plurality of wheels of a vehicle and includes a pressure sensor working to sense the inflation pressure of a tire fitted on the wheel. Each of the transmitters is configured to transmit a pressure signal representative of the inflation pressure of the tire sensed by the pressure sensor.

The receiver is mounted on the body of the vehicle and includes at least one antenna. The receiver is configured to receive the pressure signals transmitted from the transmitters via the antenna and determine the inflation pressure of the tires based on the received pressure signals.

In the above arrangement, in addition to the pressure signals transmitted by the transmitters, the receiver may also receive pressure signals transmitted by external transmitters. However, it is impossible for the receiver to determine whether a pressure signal received thereby has been transmitted by one of the transmitters or by an external transmitter. Moreover, it is also impossible for the receiver to detect the locations of the transmitters (i.e., the tires) on the vehicle. In other words, the receiver cannot identify the wheel on which the transmitter having transmitted a pressure signal and the tire whose inflation pressure is indicated by the pressure signal are located.

To solve the above problems, as disclosed in U.S. Pat. No. 5,602,524, each of the transmitters may be configured to transmit an identification signal (to be referred to as ID signal hereinafter) representative of the identification thereof along with the pressure signal. On the other hand, the receiver may be configured to have reference ID signals registered therein, each of which coincides with the ID signal of one of the transmitters and is associated with the location of that transmitter.

Thus, the receiver may work to compare an ID signal received thereby with the reference ID signals registered therein and identify the transmitter which has transmitted the ID signal when the ID signal coincides with one of the reference ID signals.

Consequently, the receiver can identify the wheel on which the identified transmitter is mounted. More specifically, the receiver can determine whether the wheel is a FR (front-right), a FL (front-left), a RR (rear-right), or a RL (rear-left) wheel of the vehicle. Further, the receiver can determine the inflation pressure of the tire fitted on the identified wheel based on the pressure signal received along with the ID signal.

However, with the above configuration, it is required to previously register the ID signals specific to the respective transmitters as reference ID signals in the receiver through associating the ID signals with the locations of the respective transmitters on the vehicle (i.e., the wheels on which the respective transmitters are mounted). Moreover, as tire replacement or rotations are performed, it is required to update the reference ID signals in the receiver.

However, the registration of the ID signals in the receiver is a time-consuming task, and thus it is desired to automatically perform the registration task. Further, for automatically performing the registration task, it is desired to automatically detect the locations of the transmitters (or the associated tires), in other words, to automatically identify the wheel on which each of the transmitters (or the associated tires) is located.

SUMMARY OF THE INVENTION

The present invention has been made in view of the above-mentioned problems.

It is, therefore, an object of the present invention to provide a wheel identifying apparatus for a vehicle which can automatically and accurately identify, for each of the transmitters (or transceivers), the wheel on which it is located without performing the time-consuming ID signal registration task.

It is a further object of the present invention to provide a wheel identifying apparatus for a vehicle which can automatically and accurately identify, for each of the transmitters (or transceivers), the wheel on which it is located without using any ID signals.

It is a still further object of the present invention to provide a tire inflation pressure detecting apparatus for a vehicle which can automatically and accurately detect the locations as well as the inflation pressure of tires on the vehicle.

According to the present invention, there is provided a wheel identifying apparatus which includes:

a first and a second transceiver which are respectively located on a first and a second wheel of a vehicle, each of the transceivers working to receive a trigger signal and transmit a response signal in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers; and a wheel identifier operatively connected to the receiver, the wheel identifier working to identify, for each of the response signals received by the receiver, the wheel on which the transceiver having transmitted the response signal is located.

According to an implementation of the invention, the wheel identifying apparatus is configured such that:

upon receipt of the trigger signal transmitted by the triggering device, each of the transceivers determines the strength of the trigger signal thereat and transmits the response signal which conveys signal strength information indicative of the determined strength of the trigger signal, and the wheel identifier identifies, for each of the response signals received by the receiver, the wheel on which the transceiver having transmitted the response signal is located based on the signal strength information conveyed by the response signal.

According to another implementation of the invention, the wheel identifying apparatus is configured such that:

upon receipt of the trigger signal transmitted by the triggering device, each of the transceivers determines the strength of the trigger signal thereat, determines a transmission time according to the determined strength of the trigger signal, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

According to yet another implementation of the invention, the wheel identifying apparatus is configured such that:

each of the transceivers has a variable receiver sensitivity and receives the trigger signal transmitted by the triggering device with a higher value of the receiver sensitivity, in response to receipt of the trigger signal, each of the transceivers changes the receiver sensitivity thereof from the higher value to a lower value, after transmission of the trigger signal, the triggering device further transmits a check signal, each of the transceivers determines a receiving behavior thereof in reception of the check signal with the lower value of the receiver sensitivity, each of the transceivers transmits the response signal which conveys receiving behavior information indicative of the determined receiving behavior, and the wheel identifier identifies, for each of the response signals received by the receiver, the wheel on which the transceiver having transmitted the response signal is located based on the receiving behavior information conveyed by the response signal.

According to still another implementation of the invention, the wheel identifying apparatus is configured such that:

each of the transceivers has a variable receiver sensitivity and receives the trigger signal transmitted by the triggering device with a higher value of the receiver sensitivity, in response to receipt of the trigger signal, each of the transceivers changes the receiver sensitivity thereof from the higher value to a lower value, after transmission of the trigger signal, the triggering device further transmits a check signal, each of the transceivers determines a receiving behavior thereof in reception of the check signal with the lower value of the receiver sensitivity, each of the transceivers determines a transmission time according to the determined receiving behavior and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

Further, according to the present invention, there is provided a tire inflation pressure detecting apparatus which includes:

a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;

a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers;

a wheel identifier operatively connected to the receiver, the wheel identifier working to identify, for each of the response signals received by the receiver, the wheel on which the transceiver having transmitted the response signal is located; and a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal.

According to an implementation of the invention, the tire inflation pressure detecting apparatus is configured such that:

upon receipt of the trigger signal transmitted by the triggering device, each of the transceivers determines the strength of the trigger signal thereat and transmits the response signal which conveys signal strength information indicative of the determined strength of the trigger signal as well as the tire pressure information, and the wheel identifier identifies, for each of the response signals received by the receiver, the wheel on which the transceiver having transmitted the response signal is located based on the signal strength information conveyed by the response signal.

According to another implementation of the invention, the tire inflation pressure detecting apparatus is configured such that:

upon receipt of the trigger signal transmitted by the triggering device, each of the transceivers determines the strength of the trigger signal thereat, determines a transmission time according to the determined strength of the trigger signal, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

According to yet another implementation of the invention, the tire inflation pressure detecting apparatus is configured such that:

each of the transceivers has a variable receiver sensitivity and receives the trigger signal transmitted by the triggering device with a higher value of the receiver sensitivity, in response to receipt of the trigger signal, each of the transceivers changes the receiver sensitivity thereof from the higher value to a lower value, after transmission of the trigger signal, the triggering device further transmits a check signal, each of the transceivers determines a receiving behavior thereof in reception of the check signal with the lower value of the receiver sensitivity, each of the transceivers transmits the response signal which conveys receiving behavior information indicative of the determined receiving behavior as well as the tire pressure information, and the wheel identifier identifies, for each of the response signals received by the receiver, the wheel on which the transceiver having transmitted the response signal is located based on the receiving behavior information conveyed by the response signal.

According to still another implementation of the invention, the tire inflation pressure detecting apparatus is configured such that:

each of the transceivers has a variable receiver sensitivity and receives the trigger signal transmitted by the triggering device with a higher value of the receiver sensitivity, in response to receipt of the trigger signal, each of the transceivers changes the receiver sensitivity thereof from the higher value to a lower value, after transmission of the trigger signal, the triggering device further transmits a check signal, each of the transceivers determines a receiving behavior thereof in reception of the check signal with the lower value of the receiver sensitivity, each of the transceivers determines a transmission time according to the determined receiving behavior and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

Consequently, through providing the above wheel identifying apparatus and the tire inflation pressure detecting apparatus, the objects of the present invention are achieved.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 20 is a time chart illustrating the wheel identification process of the tire inflation pressure detecting apparatus according to the sixth embodiment of the invention.

DESCRIPTION OF THE PREFERRED EMBODIMENTS

Figure 1:
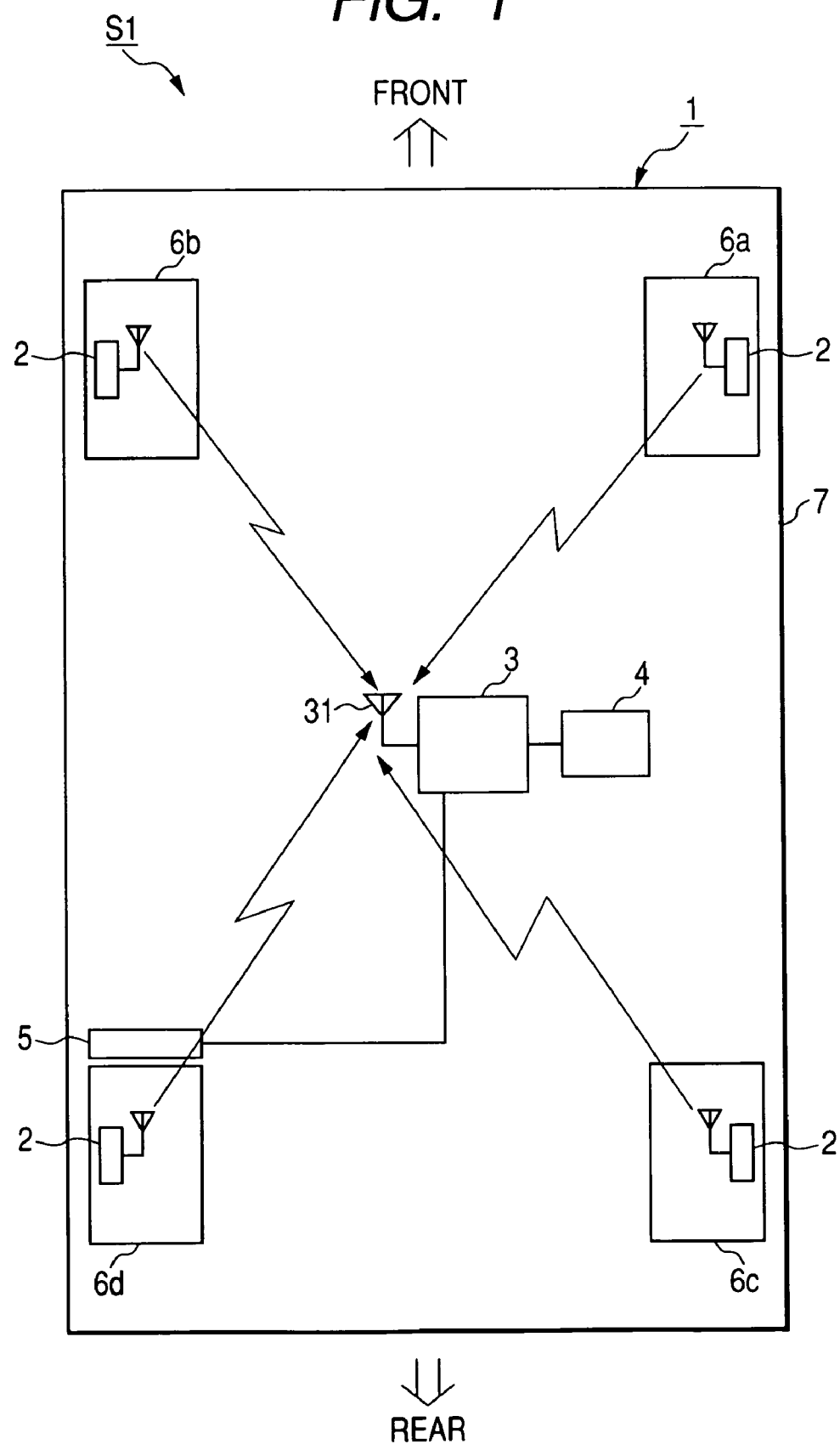
FIG. 1 is a schematic view showing the overall configuration of a tire inflation pressure detecting apparatus according to the first embodiment of the invention.

The preferred embodiments of the present invention will be described hereinafter with reference to FIGS. 1-20.

It should be noted that, for the sake of clarity and understanding, identical components having identical functions in different embodiments of the invention have been marked, where possible, with the same reference numerals in each of the figures.

First Embodiment

FIG. 1 shows the overall configuration of a tire inflation pressure detecting apparatus S1 according the first embodiment of the invention.

The tire inflation pressure detecting apparatus S1 is installed to a vehicle 1 and configured to detect the inflation pressure of four tires each of which is fitted on one of four wheels 6a-6d of the vehicle 1 (i.e., the FR wheel 6a, the FL wheel 6b, the RR wheel 6c, and the RL wheel 6d).

As shown in FIG. 1, the tire inflation pressure detecting apparatus S1 includes four transceivers 2, a receiver 3, a warning device 4, and a triggering device 5.

Each of the transceivers 2 is mounted on one of the four wheels 6a-6d, so as to have association with the tire on the one of the wheels 6a-6d.

Each transceiver 2 works to sense the inflation pressure of the associated tire and transmit a frame that contains tire pressure information indicative of the sensed inflation pressure of the associated tire.

Figure 2A:
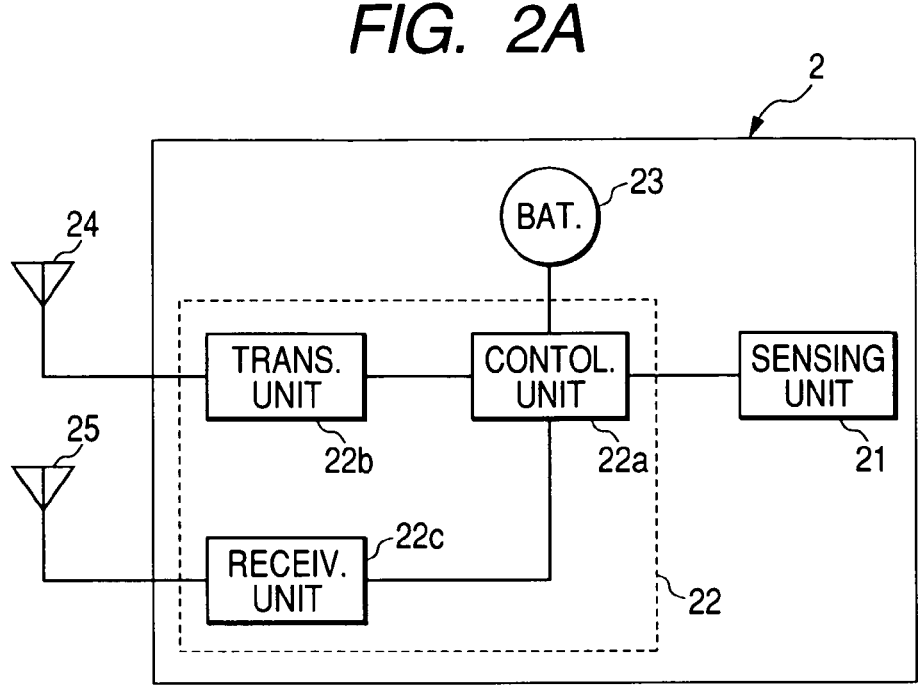
FIG. 2A is a functional block diagram showing the configuration of each of transceivers of the tire inflation pressure detecting apparatus of FIG. 1.

Referring to FIG. 2A, each transceiver 2 is configured with a sensing unit 21, a microcomputer 22, a battery 23, a transmitting antenna 24, and a receiving antenna 25.

The sensing unit 21 is configured with sensors, such as a diaphragm-type pressure sensor and a temperature sensor, and works to output signals representative of the sensed inflation pressure of the tire and the sensed temperature of air in the tire.

The microcomputer 22 is of a well-known type and functionally includes a controlling unit 22a, a transmitting unit 22b, and a receiving unit 22c. The microcomputer 22 is configured to implement predetermined processes in accordance with a program installed in a memory (not shown) of the controlling unit 22a.

The controlling unit 22a works to receive the signals outputted from the sensing unit 21 and process those signals. The controlling unit 22a also works to assemble the frame, which contains the tire pressure information indicative of the inflation pressure of the tire sensed by the sensing unit 21, and provide the frame to the transmitting unit 22b.

Further, the controlling unit 22a works to receive, via the receiving antenna 25 and the receiving unit 22c, a trigger signal transmitted by the triggering device 5 and determine the strength of the received trigger signal through signal processing thereof. The controlling unit 22a also works to store, in the frame or another frame, signal strength information indicative of the determined strength.

Furthermore, the controlling unit 22a works to control the transmitting unit 22b to transmit the frame.

The transmitting unit 22b works to transmit, via the transmitting antenna 24, the frame provided by the controlling unit 22a to the receiver 3.

The receiving unit 22c works to receive, via the receiving antenna 25, the trigger signal transmitted by the triggering device 5 and provide the received trigger signal to the controlling unit 22a.

The battery 23 is provided to supply electrical power necessary for operation of the other units.

The above-described transceivers 2 each are fixed to an air valve of an associated one of the wheels 6a-6d of the vehicle 1 and at least the sensing unit 21 thereof is placed inside the tire on the wheel so as to be exposed to the air within the tire.

On the other hand, the receiver 3 is mounted on the body 7 of the vehicle 1. The receiver 3 works to receive all the frames transmitted by the transceivers 2 and determine the inflation pressure of the four tires based on the tire pressure information contained in the received frames. The receiver 3 also works to identify, for each of the received frames, the wheel on which the transceiver 2 having transmitted the frame is mounted.

Figure 2B:
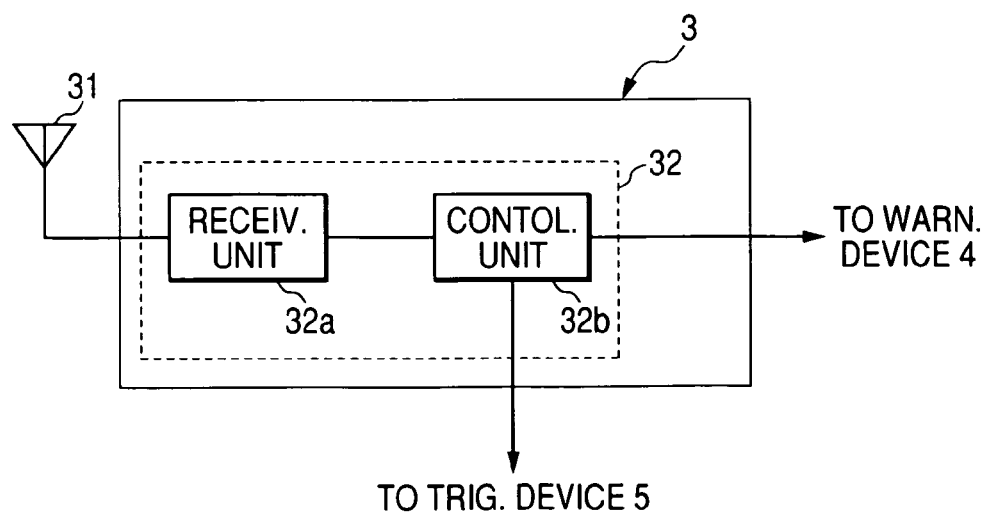
FIG. 2B is a functional block diagram showing the configuration of a receiver of the tire inflation pressure detecting apparatus of FIG. 1.

Referring to FIG. 2B, the receiver 3 is configured with a receiving antenna 31 and a microcomputer 32.

The receiving antenna 31 is fixed to the body 7 of the vehicle 1 to receive, as illustrated in FIG. 1, all the frames transmitted by the four transceivers 2.

The microcomputer 32 is of a well-known type and functionally includes a receiving unit 32a and a controlling unit 32b. The microcomputer 32 is configured to implement predetermined processes, based on the signals contained in the frames transmitted from the transceivers 2, in accordance with a program installed in a memory (not shown) of the controlling unit 32b.

The receiving unit 32a works to receive, via the receiving antenna 31, all the frames transmitted by the transceivers 2 and provide the received frames to the controlling unit 32b.

The controlling unit 32b works to output a command signal to the triggering device 5 for causing the triggering device 5 to transmit the trigger signal. The controlling unit 32b also works to identify, for each of the frames received from the receiving unit 32a, the wheel on which the transceiver 2 having transmitted the frame is mounted.

The controlling unit 32b further works to determine, for each of the frames received from the receiving unit 32a, the inflation pressure of the tire that is located on the same wheel as the transceiver 2 having transmitted the frame based on the tire pressure information contained in the frame.

Thus, both the inflation pressure and location of each of the four tires can be determined by the controlling unit 32b. When the determined inflation pressure of any of the four tires is decreased to below a predetermined threshold Th, the controlling unit 32b outputs a warning signal indicative of both the decreased inflation pressure and location of the tire.

The warning device 4 is, as illustrated in FIG. 1, electrically connected to the receiver 3 and arranged in a location visible for the driver of the vehicle 1. The warning device 4 is configured with, for example, a warning display on the instrument panel of the vehicle 1. The warning device 4 works to inform, in response to receipt of the warning signal from the receiver 3, the driver of both the decreased inflation pressure and location of the tire.

The triggering device 5 works to transmit, in response to receipt of the command signal from the receiver 3, the trigger signal with predetermined strength. The triggering device 5 is arranged on the body 7 of the vehicle 1 at different distances from the wheels 6a-6d, so that the strengths of the trigger signal at the transceivers 2 are different from each other. For example, in the present embodiment, the triggering device 5 is arranged, as illustrated in FIG. 1, in close vicinity to the RL wheel 6d of the vehicle 1. Thus, the distances from the triggering device 5 to the wheels 6a-6d increase in the order of the RL wheel 6d, the RR wheel 6c, the FL wheel 6b, and the FR wheel 6a.

In addition, it is preferable for the triggering device 5 to be arranged in such a location that no metal member covers the triggering device 5 and it is possible to protect the triggering device 5 from foreign matters, such water and a stone, during running of the vehicle 1. Further, it is also preferable for the triggering device 5 to be arranged in such a location that the differences among the distances from the triggering device 5 to the wheels 6a-6d are large. For example, the triggering device 5 may be arranged on the rear side of the RR wheel 6c and the RL wheel 6D or on the front side of the FR wheel 6a and the FL wheel 6b.

After having described the overall configuration of the tire inflation pressure detecting apparatus S1, operation thereof will be described hereinafter.

According to the present embodiment, the tire inflation pressure detecting apparatus S1 has two different operation modes. The first mode is "ID registration mode" and the second one is "tire pressure detection mode". The tire inflation pressure detecting apparatus S1 is configured to operate in the ID registration mode first and then in the tire pressure detection mode.

Specifically, when an ignition switch (not shown) of the vehicle 1 is turned from off to on, the receiver 3 and the triggering device 5 are supplied with electric power from a battery (not shown) on the vehicle 1, thus entering the ID registration mode.

Then, the controlling unit 32b of the receiver 3 outputs the command signal to the triggering device 5. In response to receipt of the command signal, the triggering device 5 transmits the trigger signal with the predetermined strength to each of the transceivers 2.

Upon receiving the trigger signal via the receiving antenna 25 and the receiving unit 22c, the controlling unit 22a of each of the transceivers 2 is activated to determine the strength of the trigger signal thereat.

Figure 3:
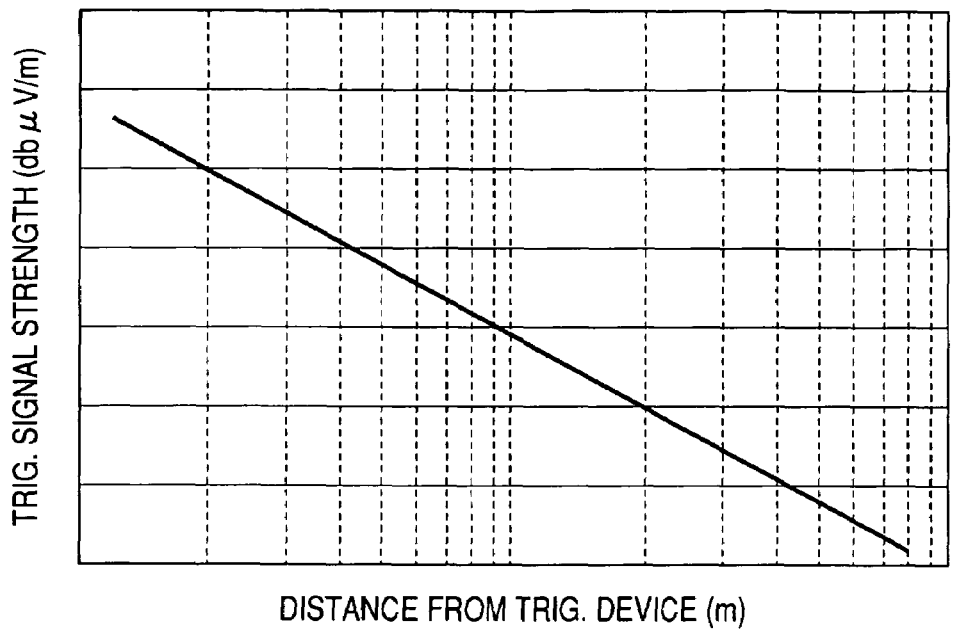
FIG. 3 is a graphical representation illustrating the attenuation characteristic of strength of a trigger signal, in a free space, with distance from a triggering device which transmits the trigger signal.
Figure 4:
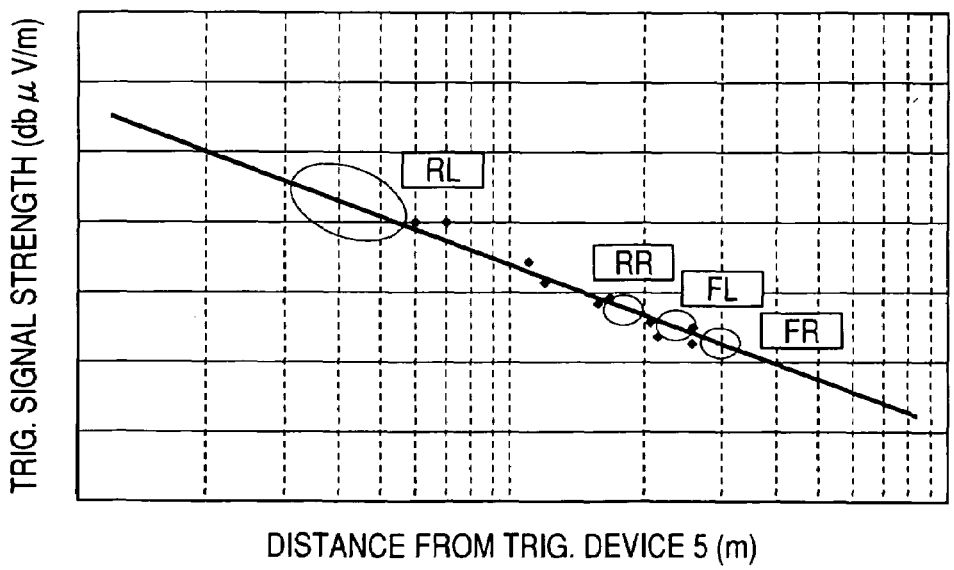
FIG. 4 is an application of FIG. 3 to the tire inflation pressure detecting apparatus of FIG. 1.

It is easy to understand that the strength of the trigger signal attenuates with increase in the distance from the triggering device 5. FIG. 3 illustrates the attenuation characteristic of strength of a trigger signal in a free space with distance from a triggering device which transmits the trigger signal. FIG. 4 illustrates an application of FIG. 3 to the tire inflation pressure detecting apparatus S1.

Specifically, as described above, the distances from the triggering device 5 to the wheels 6a-6d increase in the order of the RL wheel 6d, the RR wheel 6c, the FL wheel 6b, and the FR wheel 6a. Accordingly, the strengths of the trigger signal at the associated transceivers 2 decrease in the order of the RL wheel 6d, the RR wheel 6c, the FL wheel 6b, and the FR wheel 6a.

After determining the strength of the trigger signal thereat, the controlling unit 22a of each of the transceivers 2 stores in the frame the signal strength information indicative of the determined strength of the trigger signal and ID information indicative of the identification of the transceiver 2. Then, the controlling unit 22a sets a waiting time and controls the transmitting unit 22b to transmit the frame after elapse of the waiting time from receipt of the trigger signal.

In addition, the waiting time may be set randomly, so as to allow all the transceivers 2 to transmit the respective frames at different times, thereby avoiding interference of the frames at the receiver 3.

Upon receipt of all the frames transmitted by the transceivers 2, the controlling unit 32b of the receiver 3 retrieves the signal strength information and ID information contained in the frames. Then, the controlling unit 32b orders the frames in the descending order of the strengths of the trigger signal indicated by the signal strength information contained in the frames.

Through the ordering, the controlling unit 32b identifies the transceiver 2 which has transmitted the frame containing the signal strength information indicative of the maximum strength as being mounted on the RL wheel 6d, that which has transmitted the frame containing the signal strength information indicative of the secondary strength as being mounted on the RR wheel 6c, that which has transmitted the frame containing the signal strength information indicative of the third strength as being mounted on the FL 6b, and that which has transmitted the frame containing the signal strength information indicative of the minimum strength as being mounted on the RR wheel.

Figure 5:
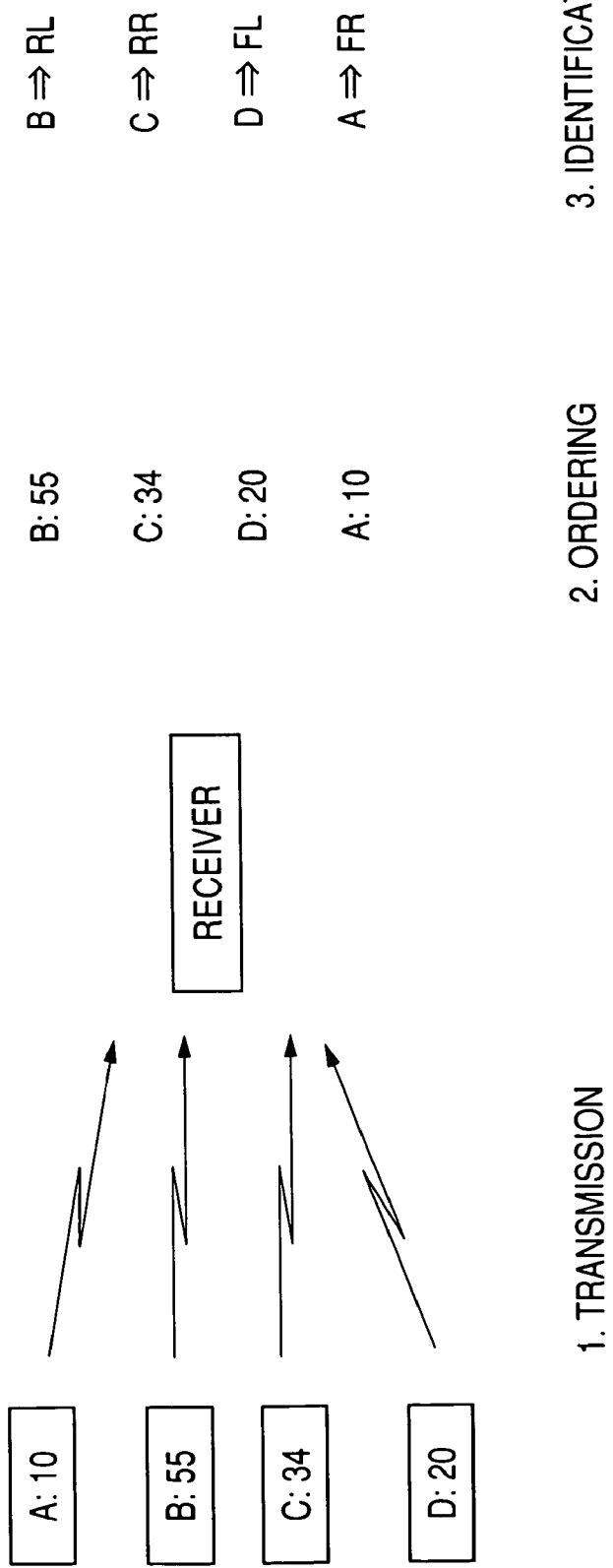
FIG. 5 is a schematic view illustrating an example of the wheel identification process of the tire inflation pressure detecting apparatus of FIG. 1.

More specifically, referring to FIG. 5, where the four transceivers 2 are respectively designated with their identifications A, B, C, and D, the strengths of the trigger signal at the transceivers A-D are different from each other. For example, the strengths of the trigger signal at the transceivers A-D are 10, 55, 34, and 20, respectively.

Figure 6:
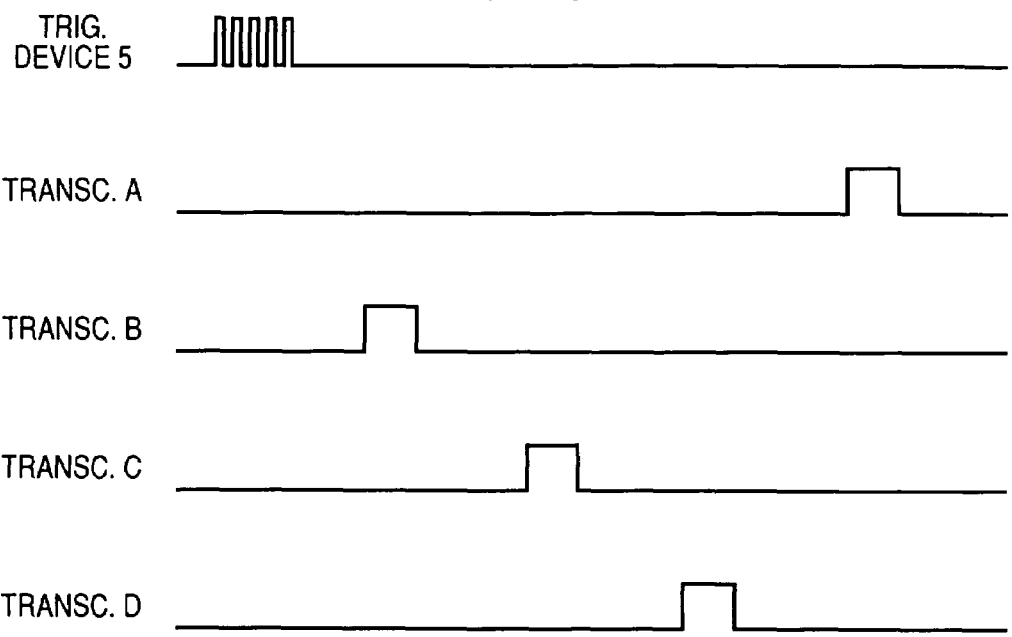
FIG. 6 is a time chart illustrating the transmission timings for a trigger signal and frames in the tire inflation pressure detecting apparatus of FIG. 1.

Referring further to FIG. 6, for transmission of the frames, the waiting times may be set to be in inverse proportion to the strengths of the trigger signal. For example, a maximum waiting time may be set for the transceiver A at which the strength of the trigger signal is minimum, so that the transceiver A transmits the frame at the last. Consequently, the transceivers A-D transmit the respective frames at different times, thus avoiding interference of the frames at the receiver 3.

Upon receipt of the frames transmitted by the transceivers A-D, the controlling unit 32b of the receivers 3 orders the transceivers A-D (in other words, orders the respective frames) in the descending order of the strengths of the trigger signal thereat, thus resulting in the order of B, C, D, and A.

Through the ordering, controlling unit 32b identifies, for each of the transceivers A-D, the wheel on which it is mounted. Consequently, the transceiver B is identified as being mounted on the RL wheel 6d, the transceiver C is identified as being mounted on the RR wheel 6c, the transceiver D is identified as being mounted on the FL wheel 6b, and the transceiver A is identified as being mounted on the FR wheel 6a.

After the wheel identification, the controlling unit 32b of the receiver 3 registers in the memory thereof the ID information contained in the received frames as reference ID information associated with the respective identified wheels.

Then, the operation of the tire inflation pressure detecting apparatus S1 is shifted from the ID registration mode to the tire pressure detection mode.

In the tire pressure detection mode, the controlling unit 22a of each of the transceivers 2 receives the signals outputted from the sensing unit 21 and processes those signals. Then, the controlling unit 22a stores in the frame the tire pressure information indicative of the inflation pressure of the associated tire sensed by the sensing unit 21 along with the ID information indicative of the identification of the transceiver 2. Further, the controlling unit 22a controls the transmitting unit 22b to repeatedly transmit the frame at predetermined time intervals (e.g., one minute).

The controlling unit 32b of the receiver 3 receives all the frames transmitted by the transceivers 2 via the receiving antenna 31 and the receiving unit 32a.

Then, the controlling unit 32b identifies, for each of the received frames, the wheel on which the transceiver 2 having transmitted the frame is mounted through comparison of the ID information contained in the frame with all the reference ID information registered in the memory.

Further, the controlling unit 32b determines, for each of the received frames, the inflation pressure of the tire that is located on the same wheel as the transceiver 2 having transmitted the frame based on the tire pressure information contained in the frame.

In addition, each of the frames transmitted by the transceivers 2 may contain tire temperature information indicative of the temperature of air within the associated tire, so that the controlling unit 32b of the receiver 3 can perform, if necessary, temperature compensation for the determined inflation pressure of the tires based on the temperature information contained in the respective received frames.

Consequently, both the inflation pressure and location of each of the four tires are determined by the controlling unit 32b. When the determined inflation pressure of any of the four tires is decreased to below the predetermined threshold Th, the controlling unit 32b informs, via the warning device 4, the driver of both the decreased inflation pressure and location of the tire.

When the ignition switch of the vehicle 1 is turned from on to off, the controlling unit 32b of the receivers 3 transmits again the command signal, causing the triggering device 5 to transmit the trigger signal. Upon receiving the trigger signal via the receiving antenna 25 and the receiving unit 22c, the controlling unit 22a of each of the transceivers 2 is deactivated, thus completing the entire operation of the tire inflation pressure detecting apparatus S1.

The above-described tire inflation pressure detecting apparatus S1 according to the present embodiment has the following advantages.

In the tire inflation pressure detecting apparatus S1, the triggering device 5 is arranged on the body 7 of the vehicle 1 at different distances from the wheels 6a-6d, thus making the strengths of the trigger signal at the transceivers 2 different from each other; each of the transceivers 2 transmits the frame containing the signal strength information indicative of the strength of the trigger signal at the transceiver 2; the receiver 3 identifies, for each of the frames received from the transceivers 2, the wheel on which the transceiver 2 having transmitted the frame is mounted based on the signal strength information contained in the frame.

With the above configuration, it is possible for the receiver 3 to accurately determine the locations of the transceivers 2 on the vehicle 1.

Accordingly, with the above configuration, it is possible for the tire inflation pressure detecting apparatus S1 to automatically and accurately detect the locations as well as the inflation pressure of the tires on the vehicle 1.

Further, with the above configuration, it is possible for the tire inflation pressure detecting apparatus S1 to automatically and reliably perform the ID information registration task.

Furthermore, it is possible for all the transceivers 2 to have the same configuration and for the receiver 3 to include only the single receiving antenna 31, thus decreasing the manufacturing cost of the tire inflation pressure detecting apparatus S1.

In addition, in the present embodiment, the tire inflation pressure detecting apparatus S1 is configured to operate in the two different modes, i.e., the ID registration mode and the tire pressure detection mode.

However, the tire inflation pressure detecting apparatus S1 may also be configured to operate only in a single mode in which: each of the transceivers 2 repeatedly transmits, at the predetermined time intervals, the frame that contains the tire pressure information indicative of the inflation pressure of the associated tire and the signal strength information indicative of the strength of the trigger signal at the transceiver 2; the receiver 3 identifies, for each of the frames received from the transceivers 2, the wheel on which the transceiver 2 having transmitted the frame is mounted based on the signal strength information contained in the frame; the receiver 3 further determines, for each of the frames received from the transceivers 2, the inflation pressure of the tire that is located on the same wheel as the transceiver 2 having transmitted the frame based on the tire pressure information contained in the frame.

With such a modified configuration, it is possible to automatically and accurately detect the locations as well as the inflation pressure of the tires on the vehicle 1 without using any ID information.

Second Embodiment

This embodiment illustrates a tire inflation pressure detecting apparatus S2 which has almost the same configuration as the tire inflation pressure detecting apparatus S1 according to the previous embodiment. Accordingly, only the differences therebetween will be described hereinafter.

In the previous embodiment, each of the four transceivers 2 receives the trigger signal transmitted by the triggering device 5 and transmits the frame containing the signal strength information indicative of the strength of the trigger signal at the transceiver 2; the receiver 3 identifies, for each of the frames received from the four transceivers 2, the wheel on which the transceiver 2 having transmitted the frame is mounted based on the signal strength information contained in the frame.

In comparison, in the present embodiment, the triggering device 5 outputs the trigger signal with a limited strength, so that one of the four transceivers 2 cannot receive the trigger signal.

Figure 7:
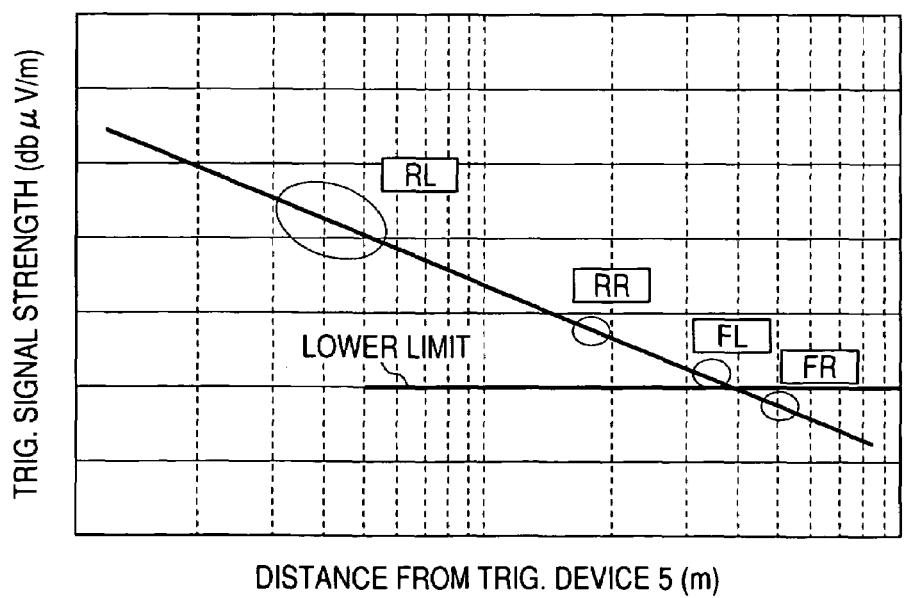
FIG. 7 is an application of FIG. 3 to a tire inflation pressure detecting apparatus according to the second embodiment of the invention.

Specifically, in some practical cases, the output strength of the trigger signal is limited due to regulations. Consequently, as illustrated in FIG. 7, the strength of the trigger signal at the transceiver 2 on the FR wheel 6a becomes lower than a lower limit of strength under which the transceiver 2 cannot detect the trigger signal.

The other three transceivers 2 that can receive the trigger signal operate in the same way as in the previous embodiment.

Figure 8:
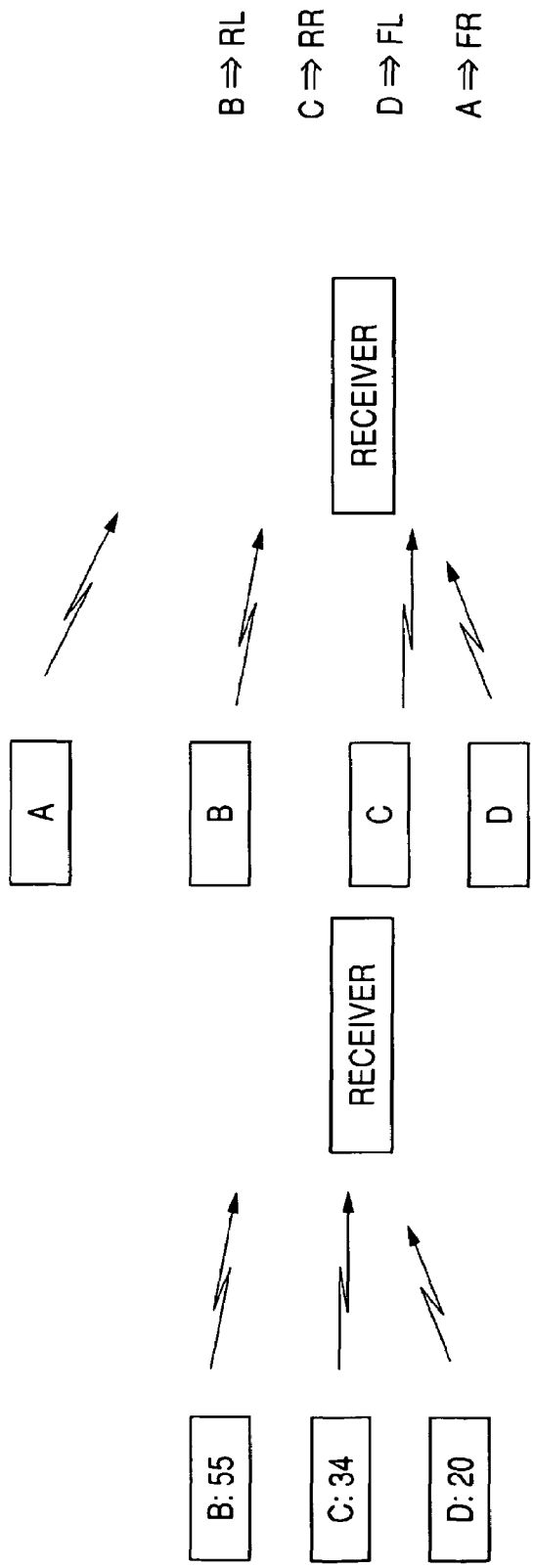
FIG. 8 is a schematic view illustrating an example of the wheel identification process of the tire inflation pressure detecting apparatus according to the second embodiment of the invention.

For example, referring to FIG. 8, the strengths of the trigger signal at the three transceivers B-C are 55, 34, and 20, respectively.

In the ID registration mode, each of the three transceivers 2 transmits the frame that contains the signal strength information indicative of the strength of the trigger signal at the transceiver 2 and the ID information indicative of the identification of the transceiver 2.

Upon receipt of the frames transmitted by the transceivers B-D, the controlling unit 32b of the receivers 3 orders the transceivers B-D (in other words, orders the respective frames) in the descending order of the strengths of the trigger signal thereat, thus resulting in the order of B, C, and D.

Through the ordering, controlling unit 32b identifies, for each of the transceivers B-D, the wheel on which it is mounted. Consequently, the transceiver B is identified as being mounted on the RL wheel 6d, the transceiver C is identified as being mounted on the RR wheel 6c, and the transceiver D is identified as being mounted on the FL wheel 6b.

After the wheel identification, the controlling unit 32b of the receiver 3 stores in the memory thereof the ID information indicative of the identifications B-D as the reference ID information associated with the respective identified wheels 6b-6d.

In the tire pressure detection mode, after the first receipt of the frames transmitted by all the transceivers 2, the controlling unit 32b of the receiver 3 further identifies, for the one of the frames which contains unregistered ID information indicative of the identification A, the wheel on which the transceiver 2 having transmitted the one of the frames is mounted as the FR wheel 6a. In other words, the controlling unit 32b identifies the transceiver A as being mounted on the FR wheel 6a.

Then, the controlling unit 32b of the receiver 3 registers in the memory thereof the ID information indicative of the identification A as the reference ID information associated with the FR wheel 6a.

The rest of operation of the tire inflation pressure detecting apparatus S2 is the same as that of the tire inflation pressure detecting apparatus S1 according to the previous embodiment; therefore, the description thereof is omitted here.

The tire inflation pressure detecting apparatus S2 according to the present embodiment has the same advantages as the tire inflation pressure detecting apparatus S1 according to the previous embodiment. Further, the tire inflation pressure detecting apparatus S2 has an additional advantage of being capable of accurately determining the locations of the transceivers 2 and thus those of the associated tires even when the output strength of the trigger signal is limited.

In addition, in the present embodiment, it is impossible for the receiver 3 to activate and deactivate the transceiver 2 on the FR wheel 6a via the trigger signal. Then, other methods may be used instead, such as configuring the transceivers 2 to include a motion sensor for sensing rotation of the associated tire and to be self-activated and self-deactivated based on the sensed rotation.

Third Embodiment

This embodiment illustrates a tire inflation pressure detecting apparatus S3 which has almost the same configuration as the tire inflation pressure detecting apparatus S1 according to the first embodiment. Accordingly, only the differences therebetween will be described hereinafter.

In the first embodiment, there is provided only the single triggering device 5 in the tire inflation pressure detecting apparatus S1. Further, the trigger signal transmitted by the triggering device 5 is received by all the transceivers 2.

Figure 9:
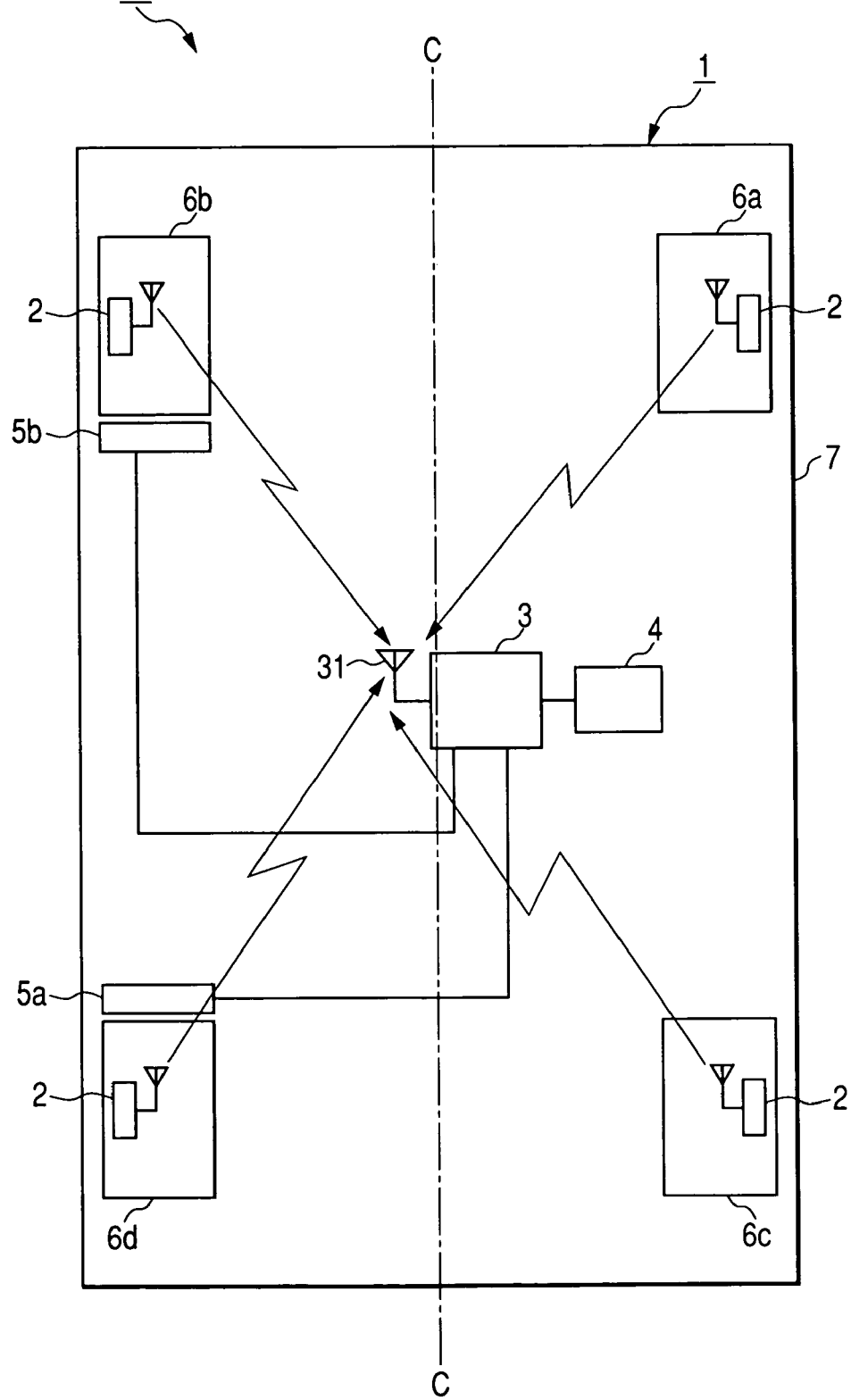
FIG. 9 is a schematic view showing the overall configuration of a tire inflation pressure detecting apparatus according to the third embodiment of the invention.

In comparison, with reference to FIG. 9, there are provided two triggering devices 5a and 5b in the tire inflation pressure detecting apparatus S3. Further, the trigger signal transmitted by each of the triggering devices 5a and 5b is received by only three of the transceivers 2.

Specifically, as shown in FIG. 9, the triggering device 5a is arranged in close vicinity to the RL wheel 6d, while the triggering device 5b is arranged in close vicinity to the FL wheel 6b. Consequently, both the triggering devices 5a and 5b are positioned on the left side of the longitudinal centerline C-C of the vehicle 1 at different distances from the wheels 6a-6d.

With the above arrangement, in the ID registration mode, the controlling unit 32b of the receiver 3 first outputs the command signal to one of the two triggering devices, for example, the triggering device 5a, thus causing the triggering device 5a to transmit the trigger signal.

As in the first embodiment, the strengths of the trigger signal transmitted by the triggering device 5a at the transceivers 2 are different from each other. Specifically, the strengths of the trigger signal transmitted by the triggering device 5a at the transceivers 2, which are respectively mounted on the wheels 6a-6d, decrease in the order of the RL wheel 6d, the RR wheel 6c, the FL wheel 6b, and the FR wheel 6a.

Figure 10A:
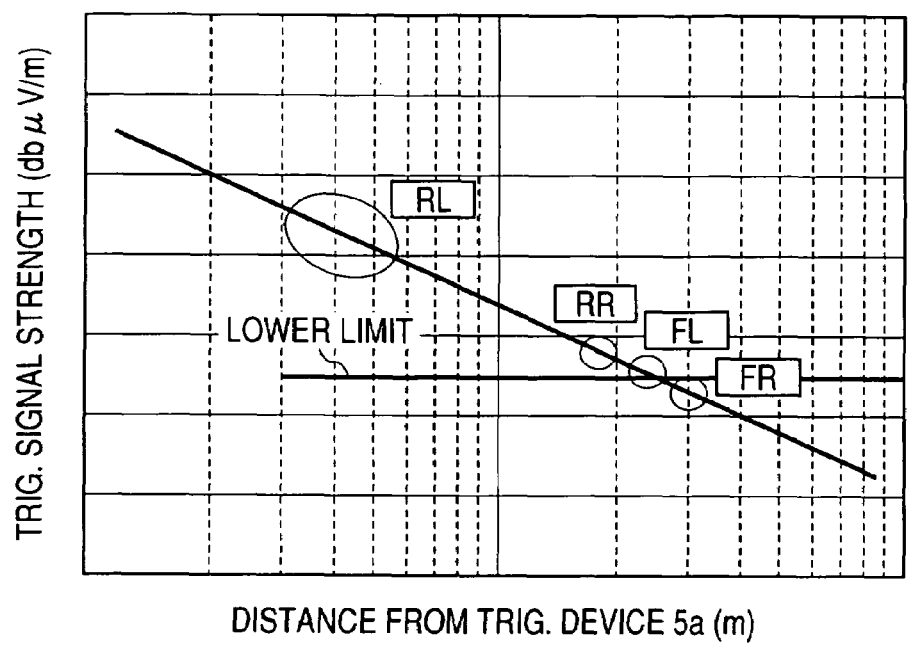
FIG. 10A is an application of FIG. 3 to the tire inflation pressure detecting apparatus of FIG. 9.

Thus, as shown in FIG. 10A, when the trigger signal is outputted by the triggering device 5a with the limited strength as in the second embodiment, the strength of the trigger signal at the transceiver 2 on the FR wheel 6a becomes lower than the lower limit of strength, so that the transceiver 2 on the FR wheel 6a cannot detect the trigger signal.

Further, since the difference between the distances from the triggering device 5a to the RR wheel 6c and the FL wheel 6b is small, the difference between the strengths of the trigger signal at the transceivers 2 on the wheels 6c ant 6b is accordingly small. Consequently, in some practically cases, it may be difficult for the controlling unit 32b of the receiver 3 to distinguish the frames received from the transceivers 2 on the wheels 6c and 6b from one another based on the strengths of the trigger signal thereat.

In consideration of the above, in the present embodiment, the controlling unit 32b of the receiver 3 further outputs the command signal to the other of the two triggering devices, i.e., the triggering device 5b, thus causing the triggering device 5b to transmit the trigger signal.

Similar to the case of the trigger signal transmitted by the triggering device 5a, the strengths of the trigger signal transmitted by the triggering device 5b at the transceivers 2 are different from each other. Specifically, the strengths of the trigger signal transmitted by the triggering device 5b at the transceivers 2, which are respectively mounted on the wheels 6a-6d, decrease in the order of the FL wheel 6b, the FR wheel 6a, the RL wheel 6d, and the RR wheel 6c.

Figure 10B:
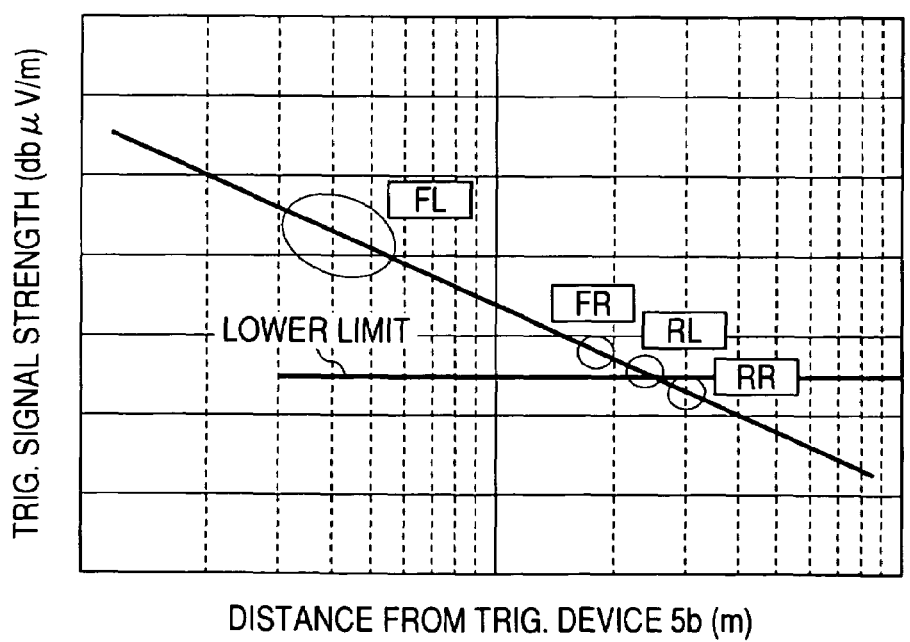
FIG. 10B is another application of FIG. 3 to the tire inflation pressure detecting apparatus of FIG. 9.

Thus, as shown in FIG. 10B, when the trigger signal is outputted by the triggering device 5b with the limited strength, the strength of the trigger signal at the transceiver 2 on the RR wheel 6c becomes lower than the lower limit of strength, so that the transceiver 2 on the RR wheel 6c cannot detect the trigger signal.

Further, since the difference between the distances from the triggering device 5b to the FR wheel 6a and the RL wheel 6d is small, the difference between the strengths of the trigger signal at the transceivers 2 on the wheels 6a ant 6d is accordingly small. Consequently, in some practical cases, it may be difficult for the controlling unit 32b of the receiver 3 to distinguish the frames received from the transceivers 2 on the wheels 6a and 6d from one another based on the strengths of the trigger signal transmitted by the triggering device 5b thereat.

Accordingly, in the present embodiment, the controlling unit 32b of the receiver 3 identifies the locations of the transceivers 2 in three stages.

Specifically, in the first stage, the controlling unit 32b receives the frames that are transmitted by the transceivers 2 on the wheels 6d, 6c, and 6b in response to receipt of the trigger signal transmitted by the triggering device 5a. Then, the controlling unit 32b identifies the transceiver 2 which has transmitted the frame containing the signal strength information indicative of the maximum strength as being mounted on the RL wheel 6d, and the other two transceivers 2 as being mounted on the RR wheel 6c or the FL wheel 6b.

In the second stage, the controlling unit 32b receives the frames that are transmitted by the transceivers 2 on the wheels 6b, 6a, and 6d in response to receipt of the trigger signal transmitted by the triggering device 5b. Then, the controlling unit 32b identifies the transceiver 2 which has transmitted the frame containing the signal strength information indicative of the maximum strength as being mounted on the FL wheel 6b, and the other two transceivers 2 as being mounted on the FR wheel 6a or the RL wheel 6d.

In the third stage, the controlling unit 32b identifies the remaining unidentified transceivers 2. Specifically, among the two transceivers 2 that have been identified as being mounted on the RR wheel 6c or the FL wheel 6b in the first stage, since one of them has been identified as being mounted on the FL wheel 6b in the second stage, the other is accordingly identified as being mounted on the RR wheel 6c. Similarly, among the two transceivers 2 that have been identified as being mounted on the FR wheel 6a or the RL wheel 6d in the second stage, since one of them has been identified as being mounted on the RL wheel 6d in the first stage, the other is accordingly identified as being mounted on the FR wheel 6a.

Consequently, the locations of all the transceivers 2 on the vehicle 1 are identified by the controlling unit 32b of the receiver 3.

Figure 11:
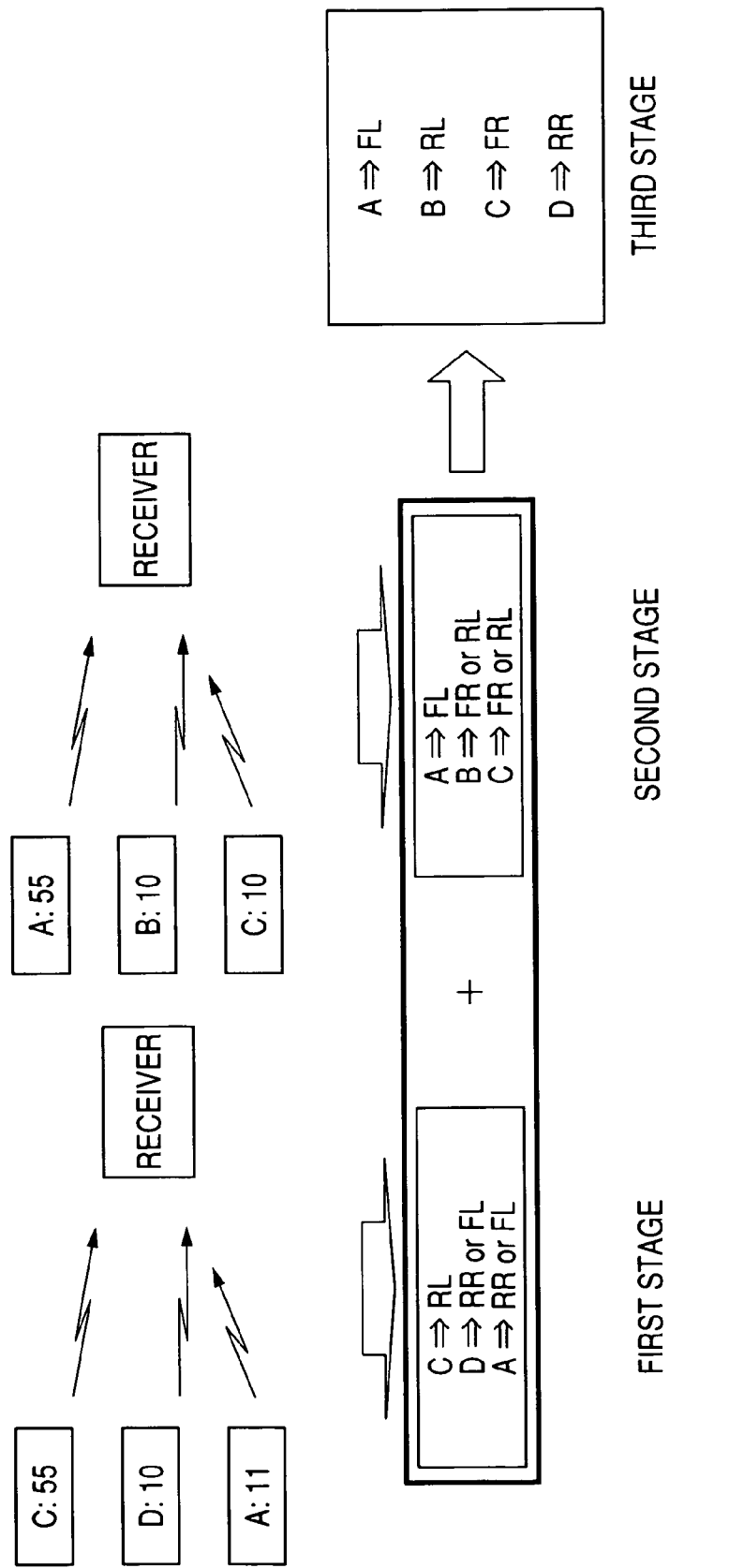
FIG. 11 is a schematic view illustrating an example of the wheel identification process of the tire inflation pressure detecting apparatus of FIG. 9.

FIG. 11 illustrates an example of the above-described wheel identification process, where the transceivers 2 are respectively designated with their identifications A-D.

As shown in FIG. 11, the trigger signal transmitted by the triggering device 5a is received by the three transceivers C, D, and A and the strengths of the trigger signal thereat are 55, 10, and 11, respectively.

Accordingly, in the first stage of the wheel identification process, the controlling unit 32b of the receiver 3 identifies the transceiver C which has the maximum strength of 55 as being mounted on the RL wheel 6d, and the other two transceivers D and A as being mounted on the RR wheel 6c or the FL wheel 6b.

Further, the trigger signal transmitted by the triggering device 5b is received by the three transceivers A, B, and C and the strengths of the trigger signal thereat are 55, 10, and 13, respectively.

Accordingly, in the second stage of the wheel identification process, the controlling unit 32b of the receiver 3 identifies the transceiver A which has the maximum strength of 55 as being mounted on the FL wheel 6b, and the other two transceivers B and C as being mounted on the FR wheel 6a or the RL wheel 6d.

In the third stage of the wheel identification process, the controlling unit 32b of the receiver 3 identifies the transceiver D as being mounted on the RR wheel 6c and the transceiver B as being mounted on the FR wheel 6a.

The tire inflation pressure detecting apparatus S3 according to the present embodiment has the same advantages as the tire inflation pressure detecting apparatus S1 according to the first embodiment. Further, the tire inflation pressure detecting apparatus S3 has an additional advantage of being capable of accurately determining the locations of the transceivers 2 and thus those of the associated tires even when the output strength of the trigger signal is limited.

In addition, in the present embodiment, it is assumed that the trigger signal transmitted by each of the triggering devices 5a and 5b is receivable by only three of the transceivers 2. However, even in the case that the trigger signal is receivable by only two of the transceivers 2, it is still possible for the receiver 3 to accurately and easily determine the locations of the transceivers 2. Such a case may happen when the triggering devices 5a and 5b transmit the respective trigger signals with more limited strength or the transceivers 2 each have a lower receiver sensitivity.

Fourth Embodiment

This embodiment illustrates a tire inflation pressure detecting apparatus S4 which has almost the same configuration as the tire inflation pressure detecting apparatus S1 according to the first embodiment. Accordingly, only the differences therebetween will be described hereinafter.

In the first embodiment, each of the transceivers 2 receives the trigger signal transmitted by the triggering device 5 and transmits the frame containing the signal strength information indicative of the strength of the trigger signal at the transceiver 2; the receiver 3 identifies, for each of the frames received from the transceivers 2, the wheel on which the transceiver 2 having transmitted the frame is mounted based on the signal strength information contained in the frame.

In comparison, in the present embodiment, the transceivers 2 receive the trigger signal transmitted by the triggering device 5 and transmit the respective frames at different transmission times according to the strengths of the trigger signal thereat; the receiver 3 thus receives the frames transmitted from the transceivers 2 at different reception times and identifies, for each of the received frames, the wheel on which the transceiver 2 having transmitted the frame is mounted based on the reception time at which the frame is received.

Specifically, upon receiving the trigger signal via the receiving antenna 25 and the receiving unit 22c, the controlling unit 22a of each of the transceivers 2 is activated to determine the strength of the trigger signal thereat.

Then, the controlling unit 22a determines a transmission time according to the determined strength of the trigger signal. For example, the transmission time may be determined by using a map stored in the memory of the controlling unit 22a and representing a predefined relationship between the strength of the trigger signal and the transmission time or calculated as a function of the strength of the trigger signal.

Since the strengths of the trigger signal at the transceivers 2 are different from each other, the transmission times determined by the controlling units 22a of the transceivers 2 are accordingly different from each other.

After assembly of the frame that contains the ID information, the controlling unit 22a of each of the transceivers 2 transmits the frame at the determined transmission time.

Thus, the receiver 3 receives all the frames transmitted by the transceivers 2 at different reception times.

Then, the controlling unit 32b of the receiver 3 identifies, for each of the received frames, the wheel on which the transceiver 2 having transmitted the frame is mounted based on the reception time at which the frame is received.

For example, the controlling unit 32b may order the received frames according to the order of the reception times at which the frames are received, and then determines the locations of the transceivers 2 having transmitted the frames through matching the order of the frames with an order of the wheels 6a-6d which are made according to the distances from the triggering device 5 to the wheels 6a-6d. Otherwise, the controlling unit 32b may store in the memory thereof the same map or the same function stored in the transceivers 2, inversely determine the strengths of the trigger signal at the transceivers 2 based on the reception times at which the respective frames from the transceivers 2 are received, and determine the locations of the transceivers 2 based on the determined strengths of the trigger signal thereat.

The rest of operation of the tire inflation pressure detecting apparatus S4 is the same as that of the tire inflation pressure detecting apparatus S1 according to the first embodiment; therefore, the description thereof is omitted here.

The tire inflation pressure detecting apparatus S4 according to the present embodiment has the same advantages as the tire inflation pressure detecting apparatus S1 according to the first embodiment.

Fifth Embodiment

Figure 12:
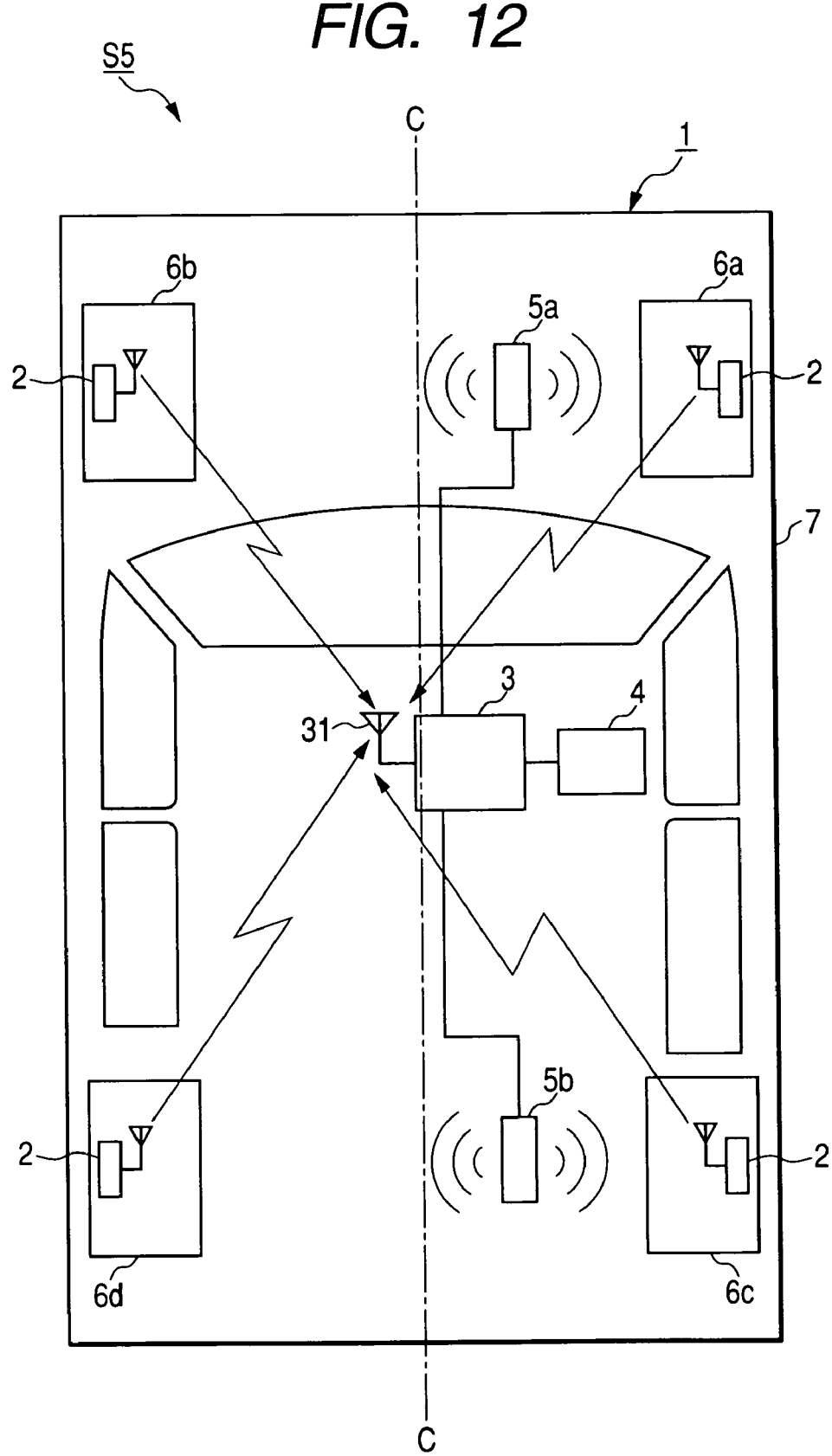
FIG. 12 is a schematic view showing the overall configuration of a tire inflation pressure detecting apparatus according to the fifth embodiment of the invention.

FIG. 12 shows the overall configuration of a tire inflation pressure detecting apparatus S5 according to the fifth embodiment of the invention. In the figure, the tire inflation pressure detecting apparatus S5 is installed to the vehicle 1 and configured to detect the inflation pressure of the four tires which are respectively fitted on the four wheels 6a-6d of the vehicle 1 (i.e., the FR wheel 6a, the FL wheel 6b, the RR wheel 6c, and the RL wheel 6d).

As shown in FIG. 12, the tire inflation pressure detecting apparatus S5 includes four transceivers 2, a receiver 3, a warning device 4, and two triggering devices 5a and 5b.

Each of the transceivers 2 is mounted on one of the four wheels 6a-6d, so as to have association with the tire on the one of the wheels 6a-6d.

Each transceiver 2 works to sense the inflation pressure of the associated tire and transmit a frame that contains tire pressure information indicative of the sensed inflation pressure of the associated tire.

Figure 13A:
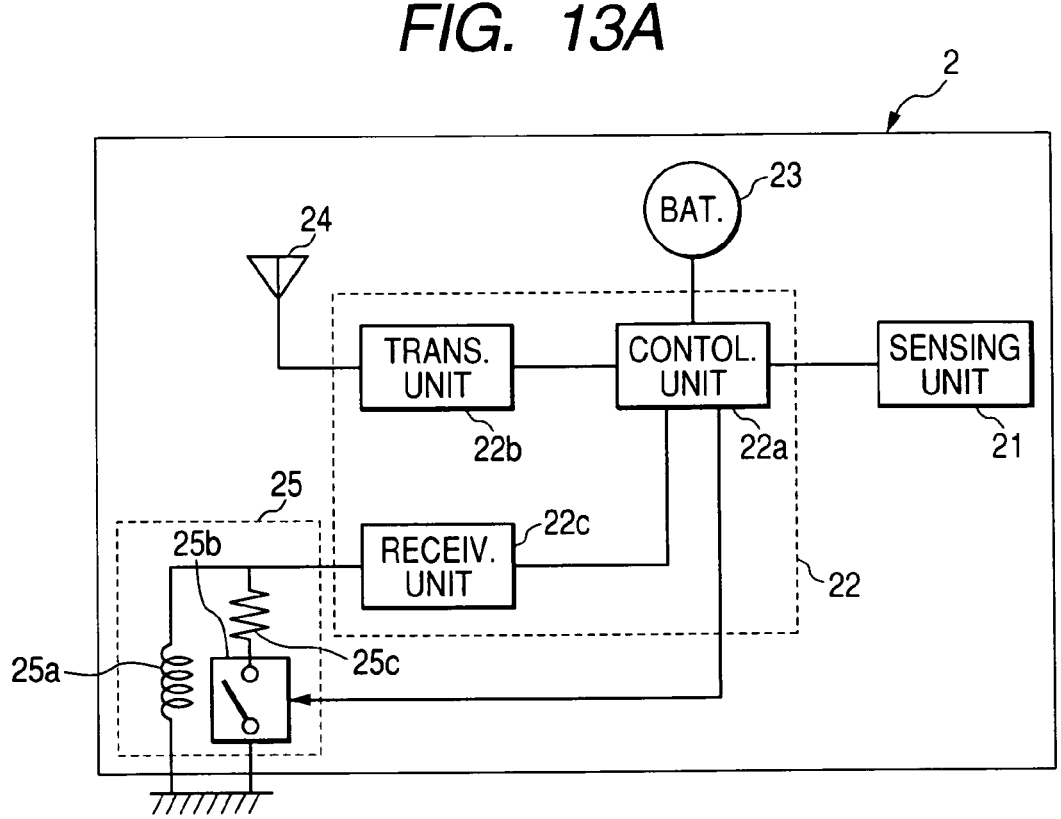
FIG. 13A is a functional block diagram showing the configuration of each of transceivers of the tire inflation pressure detecting apparatus of FIG. 12.

Referring to FIG. 13A, each transceiver 2 is configured with a sensing unit 21, a microcomputer 22, a battery 23, a transmitting antenna 24, and a receiving antenna 25.

The sensing unit 21 is configured with sensors, such as a diaphragm-type pressure sensor and a temperature sensor, and works to output signals representative of the sensed inflation pressure of the tire and the sensed temperature of air in the tire.

The microcomputer 22 is of a well-known type and functionally includes a controlling unit 22a, a transmitting unit 22b, and a receiving unit 22c. The microcomputer 22 is configured to implement predetermined processes in accordance with a program installed in a memory (not shown) of the controlling unit 22a.

The controlling unit 22a works to receive the signals outputted from the sensing unit 21 and process those signals. The controlling unit 22a also works to assemble the frame, which contains the tire pressure information indicative of the inflation pressure of the tire sensed by the sensing unit 21, and provide the frame to the transmitting unit 22b.

Further, the controlling unit 22a works to receive, via the receiving antenna 25 and the receiving unit 22c, a trigger signal transmitted by one of the triggering devices 5a and 5b and output a sensitivity-down command signal to the receiving antenna 25 in response to receipt of the trigger signal. The sensitivity-down command signal indicates an instruction for the receiving antenna 25 to change the receiver sensitivity thereof from a higher value to a lower value.

With the lower value of the receiver sensitivity of the receiving antenna 25, when a check signal is transmitted by the one of the triggering devices 5a and 5b following the transmission of the trigger signal, the controlling unit 22a can or cannot detect the check signal depending on the distance from the transceiver 2 to the one of the triggering devices 5a and 5b. In other words, with the lower value of the receiver sensitivity, the receiving behavior of the transceiver 2 in reception of the check signal is dependant on the distance from the transceiver 2 to the one of the triggering device 5a and 5b.

The controlling unit 22a further works to make a response to the transmission of the check signal by the one of the triggering devices 5a and 5b according to the receiving behavior of the transceiver 2 in reception of the check signal.

Specifically, in the present embodiment, the controlling unit 22a works to check whether the check signal is received thereby with the lower value of the receiver sensitivity of the receiving antenna 25, determine a transmission time according to the result of the check, and control the transmitting unit 22b to transmit, at the determined transmission time, the frame which conveys receiving behavior information indicative of the receiving behavior of the transceiver 2 in reception of the check signal. More specifically, in this case, the receiving behavior of the transceiver 2 is represented by the result of the check on whether the check signal is received by the transceiver 2 with the lower value of the receiver sensitivity.

The transmitting unit 22b works to transmit, via the transmitting antenna 24, the frame provided by the controlling unit 22a to the receiver 3.

The receiving unit 22c works to receive, via the receiving antenna 25, the trigger signal transmitted by one of the triggering devices 5a and 5b and provide the received trigger signal to the controlling unit 22a.

The battery 23 is provided to supply electrical power necessary for operation of the other units.

The receiving antenna 25 is configured with an antenna element 25a, a receiver sensitivity switch 25b, and a damping resistor 25c. The antenna element 25a is capable of receiving an electromagnetic wave that has a low frequency (e.g., 125 kHz). The receiver sensitivity switch 25b and the damping resistor 25c are connected in series with each other. Further, the serially connected receiver sensitivity switch 25b and damping resistor 25c are together connected in parallel with the antenna element 25a.

With such a configuration, when the receiver sensitivity switch 25b is off and the damping resistor 25c is thus electrically separated from the antenna element 25a, the receiver sensitivity of the receiving antenna 25 has the higher value. However, when the sensitivity-down command signal is outputted from the controlling unit 22a to the receiving antenna 25, the receiver sensitivity switch 25b is turned from off to on, thus bring the damping resistor 25c into parallel electrical connection with the antenna element 25a. As a result, the receiver sensitivity of the receiving antenna 25 is changed from the higher value to the lower value.

The above-described transceivers 2 each are fixed to an air valve of an associated one of the wheels 6a-6d of the vehicle 1 and at least the sensing unit 21 thereof is placed inside the tire on the wheel so as to be exposed to the air within the tire.

On the other hand, the receiver 3 is mounted on the body 7 of the vehicle 1. The receiver 3 works to receive all the frames transmitted by the transceivers 2 and determine the inflation pressure of the four tires based on the tire pressure information contained in the received frames. The receiver 3 also works to identify, for each of the received frames, the wheel on which the transceiver 2 having transmitted the frame is mounted.

Figure 13B:
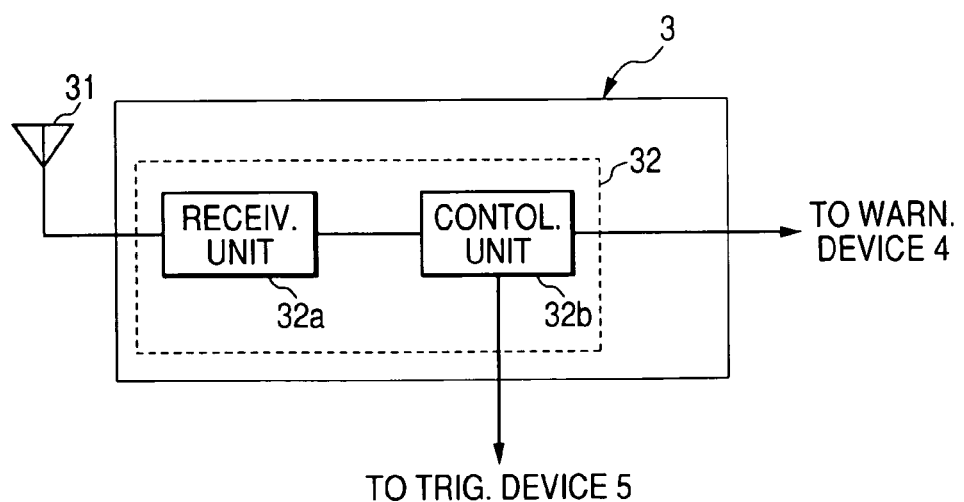
FIG. 13B is a functional block diagram showing the configuration of a receiver of the tire inflation pressure detecting apparatus of FIG. 12.

Referring to FIG. 13B, the receiver 3 is configured with a receiving antenna 31 and a microcomputer 32.

The receiving antenna 31 is fixed to the body 7 of the vehicle 1 to receive, as illustrated in FIG. 12, all the frames transmitted by the four transceivers 2.

The microcomputer 32 is of a well-known type and functionally includes a receiving unit 32a and a controlling unit 32b. The microcomputer 32 is configured to implement predetermined processes, based on the signals contained in the frames transmitted from the transceivers 2, in accordance with a program installed in a memory (not shown) of the controlling unit 32b.

The receiving unit 32a works to receive, via the receiving antenna 31, all the frames transmitted by the transceivers 2 and provide the received frames to the controlling unit 32b.

The controlling unit 32b works to output a first command signal for causing the triggering devices 5a and 5b to transmit the trigger signal and a second command signal for causing the same to transmit the check signal. The controlling unit 32b also works to identify, for each of the frames received from the receiving unit 32a, the wheel on which the transceiver 2 having transmitted the frame is mounted.

The controlling unit 32b further works to determine, for each of the frames received from the receiving unit 32a, the inflation pressure of the tire that is located on the same wheel as the transceiver 2 having transmitted the frame based on the tire pressure information contained in the frame.

Thus, both the inflation pressure and location of each of the four tires can be determined by the controlling unit 32b. When the determined inflation pressure of any of the four tires is decreased to below the predetermined threshold Th, the controlling unit 32b outputs a warning signal indicative of both the decreased inflation pressure and location of the tire.

The warning device 4 is, as illustrated in FIG. 12, electrically connected to the receiver 3 and arranged in a location visible for the driver of the vehicle 1. The warning device 4 is configured with, for example, a warning display on the instrument panel of the vehicle 1. The warning device 4 works to inform, in response to receipt of the warning signal from the receiver 3, the driver of the decreased inflation pressure and location of the tire.

The triggering devices 5a and 5b each work to transmit the trigger signal with predetermined strength in response to receipt of the first command signal from the receiver 3 and to transmit the check signal with the same strength in response to receipt of the second command signal from the receiver 3.

The triggering device 5a is arranged on the body 7 of the vehicle 1 such that it is closer to the front wheels 6a and 6b than the rear wheels 6c and 6d and at different distances from the FR wheel 6a and the FL wheel 6b. Consequently, the strengths of the check signal transmitted by the triggering device 5a at the transceivers 2 are different from each other. On the other hand, the triggering device 5b is arranged on the body 7 of the vehicle 1 such that it is closer to the rear wheels 6c and 6d than the front wheels 6a and 6b and at different distances from the RR wheel 6c and the RL wheel 6d. Consequently, the strengths of the check signal transmitted by the triggering device 5b at the transceivers 2 are also different from each other.

Further, in the present embodiment, the triggering devices 5a and 5b are positioned on the same side (i.e., the right side) of the longitudinal centerline C-C of the vehicle 1. Accordingly, the triggering device 5a is closer to the FR wheel 6a than the FL wheel 6b, and the triggering device 5b is closer to the RR wheel 6c than the RL wheel 6d.

In addition, it is preferable for the triggering devices 5a and 5b to be arranged in such locations that no metal members cover the triggering devices 5a and 5b and it is possible to protect the triggering devices 5a and 5b from foreign matters, such water and a stone, during running of the vehicle 1.

After having described the overall configuration of the tire inflation pressure detecting apparatus S5, operation thereof will be described hereinafter with reference to FIGS. 14 and 15, which respectively illustrate the processes of the receiver 3 and the transceivers 2 during the operation.

According to the present embodiment, the tire inflation pressure detecting apparatus S5 has two different operation modes. The first mode is "ID registration mode" and the second one is "tire pressure detection mode". The tire inflation pressure detecting apparatus S5 is configured to operate in the ID registration mode first and then in the tire pressure detection mode.

Specifically, when the ignition switch of the vehicle 1 is turned from off to on, the receiver 3 and the triggering devices 5a and 5b are supplied with electric power from the battery on the vehicle 1, thus entering the ID registration mode.

Figure 14:
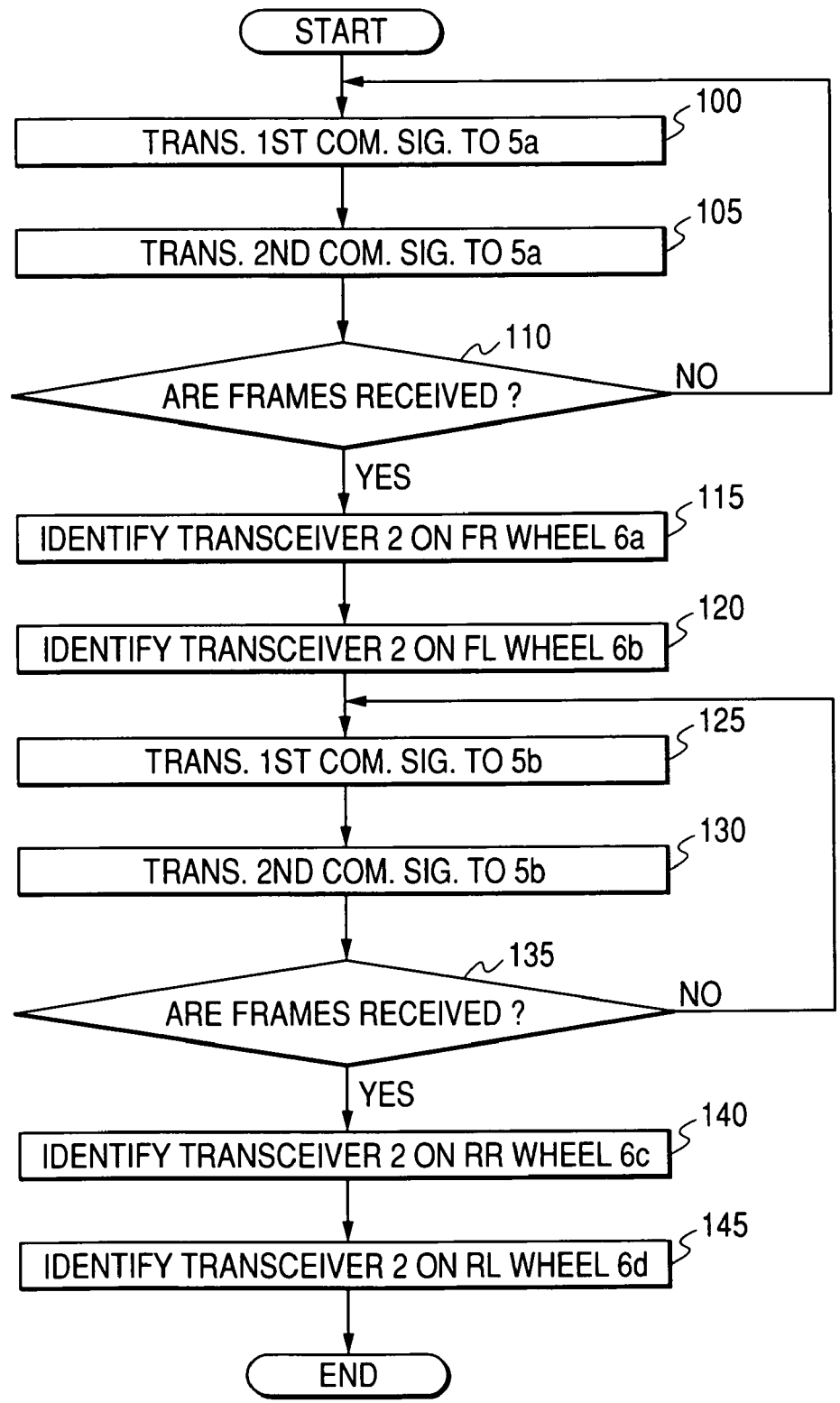
FIG. 14 is a flow chart showing a process of the receiver of the tire inflation pressure detecting apparatus of FIG. 12.

Then, the receiver 3 outputs the first command signal to the triggering device 5a, as indicated at the step 100 in FIG. 14.

In response to receipt of the first command signal, the triggering device 5a transmits the trigger signal with the predetermined strength to the transceivers 2.

Figure 15:
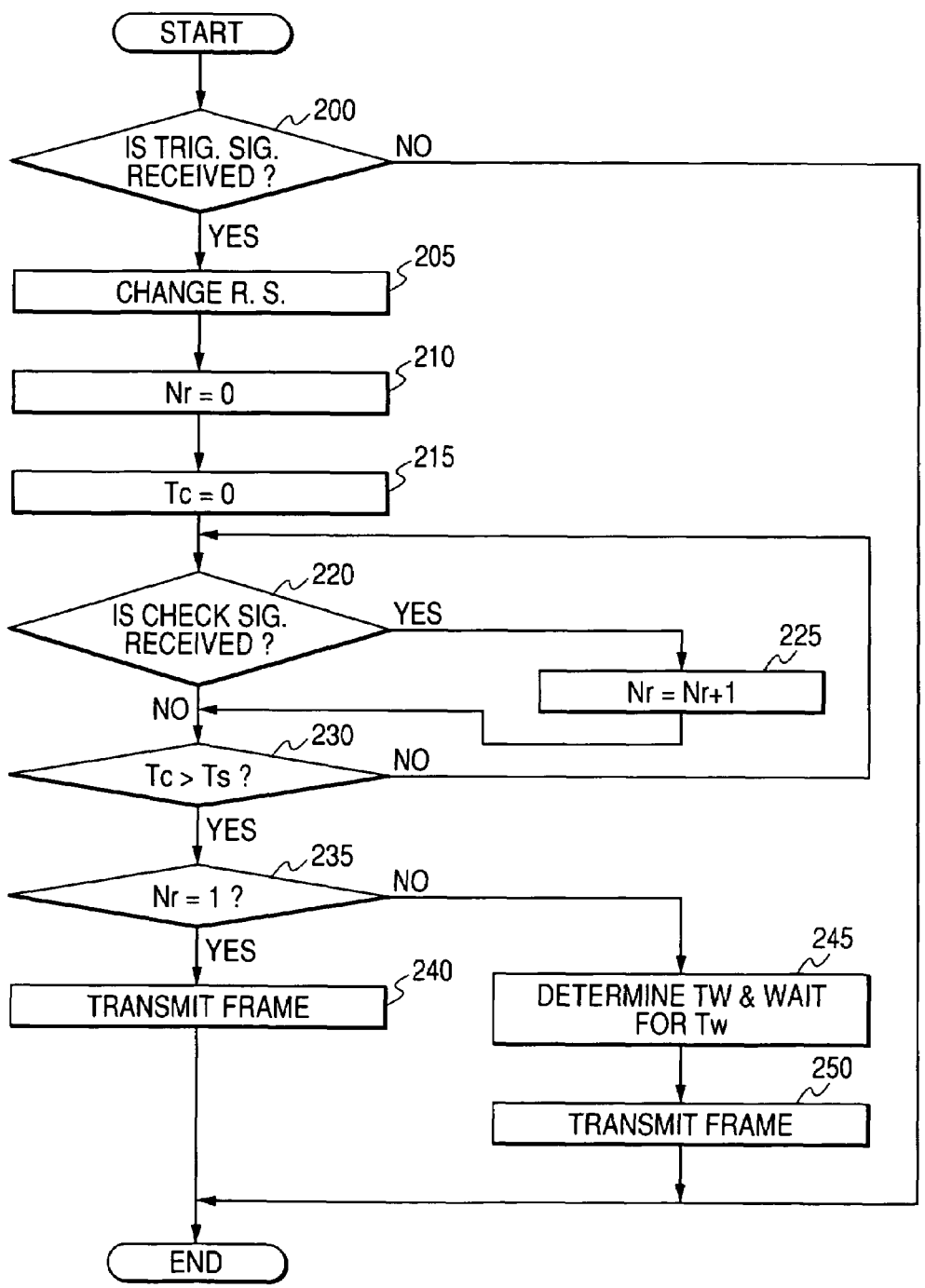
FIG. 15 is a flow chart showing a process of each of the transceivers of the tire inflation pressure detecting apparatus of FIG. 12.

On the other hand, each of the transceivers 2 checks whether the trigger signal is received thereby, as indicated at the step 200 of FIG. 15.

If the check at the step 200 results in a "NO" answer, then the process directly goes to the end.

Otherwise, if the check at the step 200 results in a "YES" answer, the process proceeds to the step 205.

Since the receiver sensitivity of each of the transceivers 2 has the higher value at this stage, the trigger signal that is transmitted by the triggering device 5a with the predetermined strength is received by both the transceivers 2 on the front wheels 6a and 6b, and thus the processes in those transceivers 2 proceed to the step 205.

At the step 205, the receiver sensitivity of each of the transceivers 2 is changed from the higher value to the lower value in response to receipt of the trigger signal.

At the step 210, a parameter Nr, which represents the number of receipts of the check signal, is set to zero; at the step 215, the count Tc of a timer in the controlling unit 22a is also set to zero.

Next, the receiver 3 outputs, after a first predetermined time period from the output of the first command signal, the second command signal to the triggering device 5a, as indicated at the step 105 in FIG. 14.

In response to receipt of the second command signal, the triggering device 5a transmits the check signal with the predetermined strength to the transceivers 2.

Turning to FIG. 15, each of the transceivers 2 on the front wheels 6a and 6b checks whether the check signal transmitted from the triggering device 5a is received thereby, as indicated at the step 220.

As described previously, the strength of the check signal attenuates with increase in the distance from the triggering device 5a. Accordingly, the strength of the check signal at the transceiver 2 on the FR wheel 6a is higher than that at the transceiver 2 on the FL wheel 6b. Consequently, with the lower values of the receiver sensitivities, the transceiver 2 on the FR wheel 6a can receive the check signal, while the transceiver 2 on the FL wheel 6b cannot.

Thus, for the transceiver 2 on the FR wheel 6a, the check at the step 220 results in a "YES" answer; the process then proceeds to the step 225.

At the step 225, the parameter Nr is increased by 1, and the process then proceeds to the step 230.

On the other hand, for the transceiver 2 on the FL wheel 6b, the check at the step 220 results in a "NO" answer; the process then directly goes to the step 230.

At the step 230, a check is made on whether the count TC of the timer is over a predetermined standby time Ts, in other words, whether the present time instant is within a second predetermined time period from the receipt of the trigger signal.

The predetermined standby time Ts (or the second predetermined time period) may be set to have a constant value (e.g., 0.1 second) or a varying value. For example, the predetermined standby time Ts may be set to vary according to various vehicle or tire conditions, such as the vehicle speed and the inflation pressure of the tires. However, in any case, the predetermined standby time Ts must be longer than or equal to the sum of the first predetermined time period and a time required for the receiver 3 to complete the transmission of the check signal.

If the check at the step 230 results in a "NO" answer, then the process returns to the step 220.

Otherwise, if the check at the step 230 results in a "YES" answer, then the process proceeds to the step 235.

At the step 235, a further check is made on whether the parameter Nr is equal to 1, in other words, whether the check signal is received by the individual transceiver 2.

For the transceiver 2 on the FR wheel 6a, the check at the step 235 results in a "YES" answer; the process then proceeds to the step 240.

At the step 240, the transceiver 2 transmits the frame that conveys ID information indicative of the identification of the transceiver 2 and the receiving behavior information indicative of the result of the check at the step 235, i.e., the presence of receipt of the check signal by the transceiver 2. Then, the process goes to the end.

On the other hand, for the transceiver 2 on the FL wheel 6b, the check at the step 235 results in a "NO" answer; the process then proceeds to the step 245.

At the step 245, a waiting time Tw is set and the transceiver 2 waits for the set waiting time Tw.

Through arrangement of the step 245, it is possible to avoid interference of the frames transmitted by the different transceivers 2 at the receiver 3.

At the succeeding step 250, the transceiver 2 transmits the frame that conveys ID information indicative of the identification of the transceiver 2 and the receiving behavior information indicative of the result of the check at the step 235, i.e., the absence of receipt of the check signal by the transceiver 2. Then, the process goes to the end.

Turning back to FIG. 14, the receiver 3 makes a check on whether the frames transmitted by the transceivers 2 on the front wheels 6a and 6b are received thereby, as indicated at the step 110.

If the check at the step 110 results in a "NO" answer, then the process returns to the step 100.

Otherwise, the check at the step 110 results in a "YES" answer, then the process proceeds to the step 115.

At the step 115, the receiver 3 identifies, for the one of the frames received thereby which contains the receiving behavior information indicative of the presence of receipt of the check signal, the wheel on which the transceiver 2 having transmitted the frame is mounted as the FR wheel 6a. Then, the receiver 3 stores in the memory thereof the ID information contained in the frame as reference ID information associated with the FR wheel 6a.

At the step 120, the receiver 3 further identifies, for the other of the frames received thereby which contains the receiving behavior information indicative of the absence of receipt of the check signal, the wheel on which the transceiver 2 having transmitted the frame is mounted as the FL wheel 6b. Then, the receiver 3 stores in the memory thereof the ID information contained in the frame as reference ID information associated with the FL wheel 6b.

At the succeeding steps 125-135, the receiver 3 performs, with respect to the transceivers 2 on the rear wheels 6c and 6d, the same process as at the steps 100-110, by sequentially outputting the first and second command signals to the triggering device 5b. Meanwhile, the transceivers 2 on the rear wheels 6c and 6d perform, as the transceivers 2 on the front wheels 6a and 6b, the process indicated in FIG. 15.

At the step 140, the receiver 3 identifies, for the one of the newly received frames which contains the receiving behavior information indicative of the presence of receipt of the check signal, the wheel on which the transceiver 2 having transmitted the frame is mounted as the RR wheel 6c. Then, the receiver 3 stores in the memory thereof the ID information contained in the frame as reference ID information associated with the RR wheel 6c.

At the step 145, the receiver 3 further identifies, for the other of the newly received frames which contains the receiving behavior information indicative of the absence of receipt of the check signal, the wheel on which the transceiver 2 having transmitted the frame is mounted as the RL wheel 6d. Then, the receiver 3 stores in the memory thereof the ID information contained in the frame as reference ID information associated with the RL wheel 6d. Then, the process goes to the end.

Thus, the receiver 3 has identified, for each of all the frames received thereby, the wheel on which the transceiver 2 having transmitted the frame is mounted based on the receiving behavior information contained in the frame.

Figure 16:
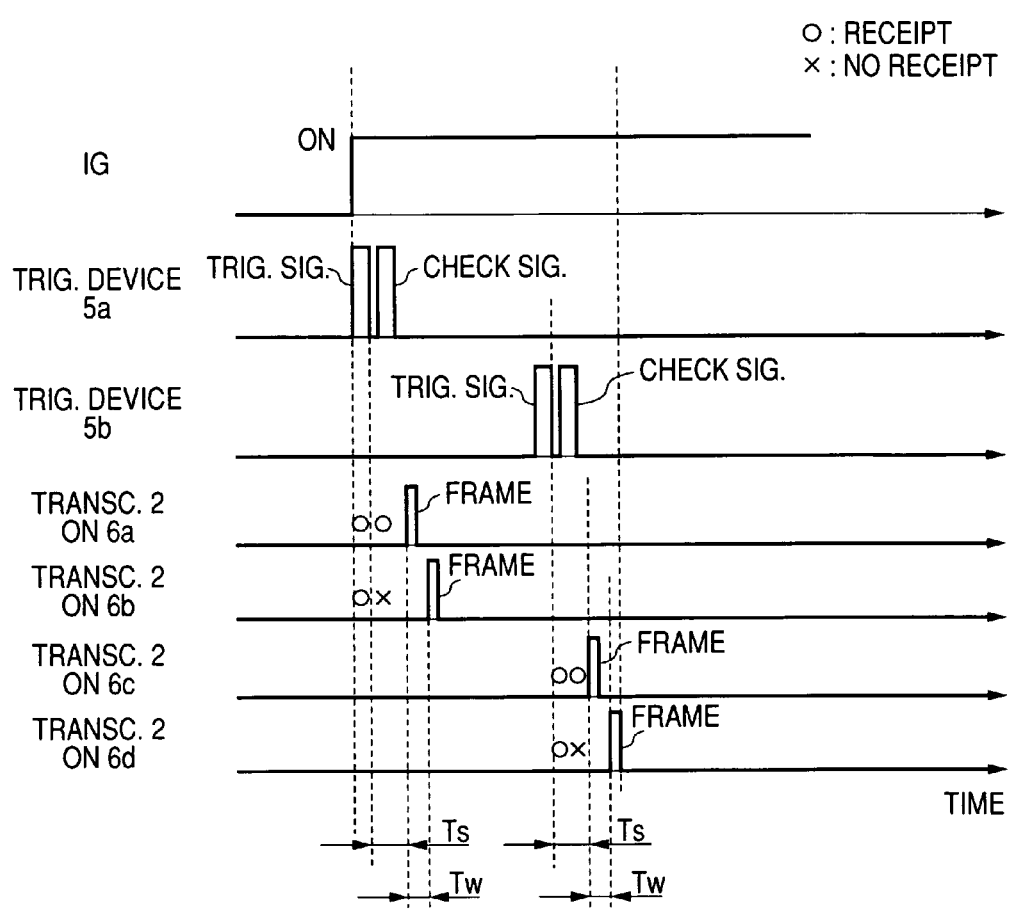
FIG. 16 is a time chart illustrating the wheel identification process of the tire inflation pressure detecting apparatus of FIG. 12.

The above-described wheel identification process may be understood more fully from FIG. 16.

As shown in FIG. 16, after the ignition switch (IG) of the vehicle 1 is turned from off to on, the triggering device 5a sequentially transmits the trigger signal (T. S.) and the check signal (C. S.).

Then, the transceiver 2 on the FR wheel 6a receives both the trigger signal and the check signal transmitted by the triggering device 5a and transmits the frame after elapse of the predetermined standby time Ts (or after the second predetermined time period) from the receipt of the trigger signal.

In comparison, the transceiver 2 on the FL wheel 6b receives only the trigger signal transmitted by the triggering device 5a and transmits the frame after elapse of a time equal to the sum of the predetermined standby time Ts and the waiting time Tw from the receipt of the trigger signal.

Thereafter, the triggering device 5b sequentially transmits the trigger signal and the check signal.

Then, the transceiver 2 on the RR wheel 6c receives both the trigger signal and the check signal transmitted by the triggering device 5b and transmits the frame after elapse of the predetermined standby time Ts from the receipt of the trigger signal.

In comparison, the transceiver 2 on the RL wheel 6d receives only the trigger signal transmitted by the triggering device 5b and transmits the frame after elapse of a time equal to the sum of the predetermined standby time Ts and the waiting time Tw from the receipt of the trigger signal.

After completion of the wheel identification process, the operation of the tire inflation pressure detecting apparatus S5 is shifted from the ID registration mode to the tire pressure detection mode.

In the tire pressure detection mode, the controlling unit 22a of each of the transceivers 2 receives the signals outputted from the sensing unit 21 and processes those signals. Then, the controlling unit 22a stores in the frame the tire pressure information indicative of the inflation pressure of the associated tire sensed by the sensing unit 21 along with the ID information indicative of the identification of the transceiver 2. Further, the controlling unit 22a controls the transmitting unit 22b to repeatedly transmit the frame at predetermined time intervals (e.g., one minute).

The controlling unit 32b of the receiver 3 receives all the frames transmitted by the transceivers 2 via the receiving antenna 31 and the receiving unit 32a.

Then, the controlling unit 32b identifies, for each of the received frames, the wheel on which the transceiver 2 having transmitted the frame is mounted through comparison of the ID information contained in the frame with all the reference ID information registered in the memory.

Further, the controlling unit 32b determines, for each of the received frames, the inflation pressure of the tire that is located on the same wheel as the transceiver 2 having transmitted the frame based on the tire pressure information contained in the frame.

Additionally, each of the frames transmitted by the transceivers 2 may contain tire temperature information indicative of the temperature of air within the associated tire, so that the controlling unit 32b of the receiver 3 can perform, if necessary, temperature compensation for the determined inflation pressure of the tires based on the temperature information contained in the respective received frames.

Consequently, both the inflation pressure and location of each of the four tires are determined by the controlling unit 32b. When the determined inflation pressure of any of the four tires is decreased to below the predetermined threshold Th, the controlling unit 32b informs, via the warning device 4, the driver of both the decreased inflation pressure and location of the tire.

To sum up, in the tire inflation pressure detecting apparatus S5 according to the present embodiment, the triggering device 5a is located at different distances from the transceivers 2 on the front wheels 6a and 6b and the triggering device 5b is located at different distances from the transceivers 2 on the rear wheels 6c and 6d; each of the transceivers 2 has the variable receiver sensitivity and changes the receiver sensitivity from the higher value to the lower value in response to receipt of the trigger signal transmitted by the corresponding one of the triggering devices 5a and 5b; with the lower values of the receiver sensitivities, there are differences between the receiving behaviors of the transceivers 2 in reception of the check signal transmitted by the corresponding ones of the triggering devices 5a and 5b; the receiver 3 identifies, for each of the frames received thereby, the wheel on which the transceiver 2 having transmitted the frame is mounted based on the receiving behavior information contained in the frame.

With the above configuration, it is possible for the receiver 3 to accurately determine the locations of the transceivers 2 on the vehicle 1.

Accordingly, with the above configuration, it is possible for the tire inflation pressure detecting apparatus S5 to automatically and accurately detect the locations as well as the inflation pressure of the tires on the vehicle 1.

Further, with the above configuration, it is possible for the tire inflation pressure detecting apparatus S5 to automatically and reliably perform the ID information registration task.

Furthermore, it is possible for all the transceivers 2 to have the same configuration and for the receiver 3 to include only the single receiving antenna 31, thus decreasing the manufacturing cost of the tire inflation pressure detecting apparatus S5.

In addition, the above configuration of the tire inflation pressure detecting apparatus S5 may be modified such that: the transceivers 2 transmit the respective frames which does not contain receiving behavior information at different transmission times according to the receiving behaviors thereof in reception of the check signal transmitted by the corresponding ones of the triggering devices 5a and 5b; the receiver 3 thus receives all the frames transmitted by the transceivers 2 at different reception times and identifies, for each of the received frames, the wheel on which the transceiver 2 having transmitted the frame is mounted based on the reception time at which the frame is received.

Moreover, in the present embodiment, the tire inflation pressure detecting apparatus S5 is configured to operate in the two different modes, i.e., the ID registration mode and the tire pressure detection mode.

However, the tire inflation pressure detecting apparatus S5 may also be configured to operate only in a single mode in which: each of the transceivers 2 repeatedly transmits, at the predetermined time intervals, the frame that contains the tire pressure information indicative of the inflation pressure of the associated tire and the receiving behavior information indicative of the receiving behavior of the transceiver 2 in reception of the check signal; the receiver 3 identifies, for each of the frames received from the transceivers 2, the wheel on which the transceiver 2 having transmitted the frame is mounted based on the receiving behavior information contained in the frame; the receiver 3 further determines, for each of the frames received from the transceivers 2, the inflation pressure of the tire that is located on the same wheel as the transceiver 2 having transmitted the frame based on the tire pressure information contained in the frame.

With such a modified configuration, it is possible to automatically and accurately detect the locations as well as the inflation pressure of the tires on the vehicle 1 without using any ID information.

Sixth Embodiment

This embodiment illustrates a tire inflation pressure detecting apparatus S6 which has almost the same configuration as the tire inflation pressure detecting apparatus S5 according to the previous embodiment. Accordingly, only the differences therebetween will be described hereinafter.

In the previous embodiment, each of the triggering devices 5a and 5b transmits the trigger signal first and the check signal after the predetermined first time period from the transmission of the trigger signal.

In comparison, in the present embodiment, each of the triggering devices 5a and 5b consecutively transmits the trigger signal and a continuous carrier which follows the trigger signal.

Figure 17:
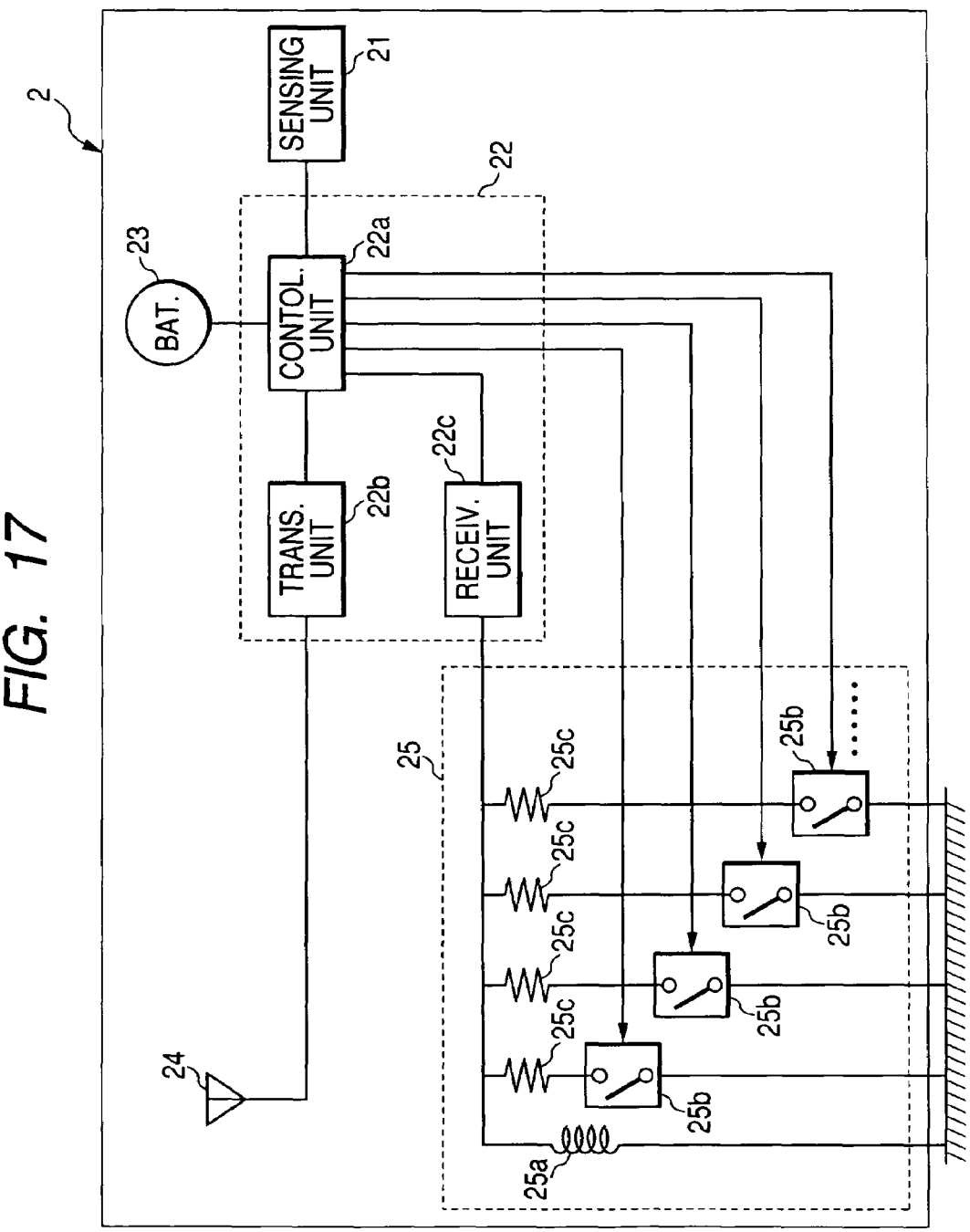
FIG. 17 is a functional block diagram showing the configuration of each of transceivers of a tire inflation pressure detecting apparatus according to the sixth embodiment of the invention.

FIG. 17 shows the configuration of each of the transceivers 2 in the tire inflation pressure detecting apparatus S6.

As shown in FIG. 17, in each of the transceivers 2, the receiving antenna 25 includes more than one pair of the receiver sensitivity switch 25b and the damping resistor 25c. Further, each pair of the receiver sensitivity switch 25b and the damping resistor 25c is connected in parallel with the antenna element 25a.

With the above configuration, it is possible for the controlling unit 22a to control the number of the damping resistors 25c which are in electrical connection with the antenna element 25a through controlling the on/off operation of the receiver sensitivity switches 25b. Further, through controlling the number of the damping resistors 25c in electrical connection with the antenna element 25a, it is possible for the controlling unit 22a to gradually change the receiver sensitivity of the receiving antenna 25 in multiple stages.

On the other hand, the controlling unit 32b of the receiver 3 outputs only a single command signal to the triggering devices 5a and 5b, thereby causing them to transmit the trigger signal and the continuous carrier consecutively.

The continuous carrier is configured with a non-modulated signal and transmitted for a third predetermined time period. The third predetermined time period is so set as to be long enough for the transceivers 2 to detect the continuous carrier multiple times.

Further, upon receipt of the trigger signal transmitted by the corresponding one of the triggering devices 5a and 5b, the controlling unit 22a of each of the transceivers 2 changes the receiver sensitivity of the receiving antenna 25 from a maximum value to a minimum value in multiple stages and determines from which stage it becomes impossible to detect the continuous carrier.

Specifically, referring to FIG. 17, the receiver sensitivity of the receiving antenna 25 has the maximum value when all the receiver sensitivity switches 25b are off and the minimum value when all the receiver sensitivity switches 25b are on. The receiver sensitivity of the receiving antenna 25 can be gradually changed from the maximum value to the minimum value in four stages.

Since the triggering devices 5a and 5b are located at different distances from the transceivers 2, the strengths of the continuous carriers at the transceivers 2 are different from each other. Accordingly, for the transceivers 2, the stages from which it becomes impossible to detect the continuous carriers are different from each other. In other words, the numbers of times the continuous carriers are detected by the transceivers 2 during the change in the receiver sensitivities are different from each other. Therefore, it is possible for the receiver 3 to determine the locations of the transceivers 2 based on the numbers of times the continuous carriers are detected by the transceivers 2 during the change in the receiver sensitivities.

After having described the overall configuration of the tire inflation pressure detecting apparatus S6, operation thereof will be described hereinafter with reference to FIGS. 18 and 19, which respectively illustrate the processes of the receiver 3 and the transceivers 2 during the operation.

When the ignition switch (not shown) of the vehicle 1 is turned from off to on, the receiver 3 and the triggering devices 5a and 5b are supplied with electric power from the battery on the vehicle 1, thus entering the ID registration mode.

Figure 18:
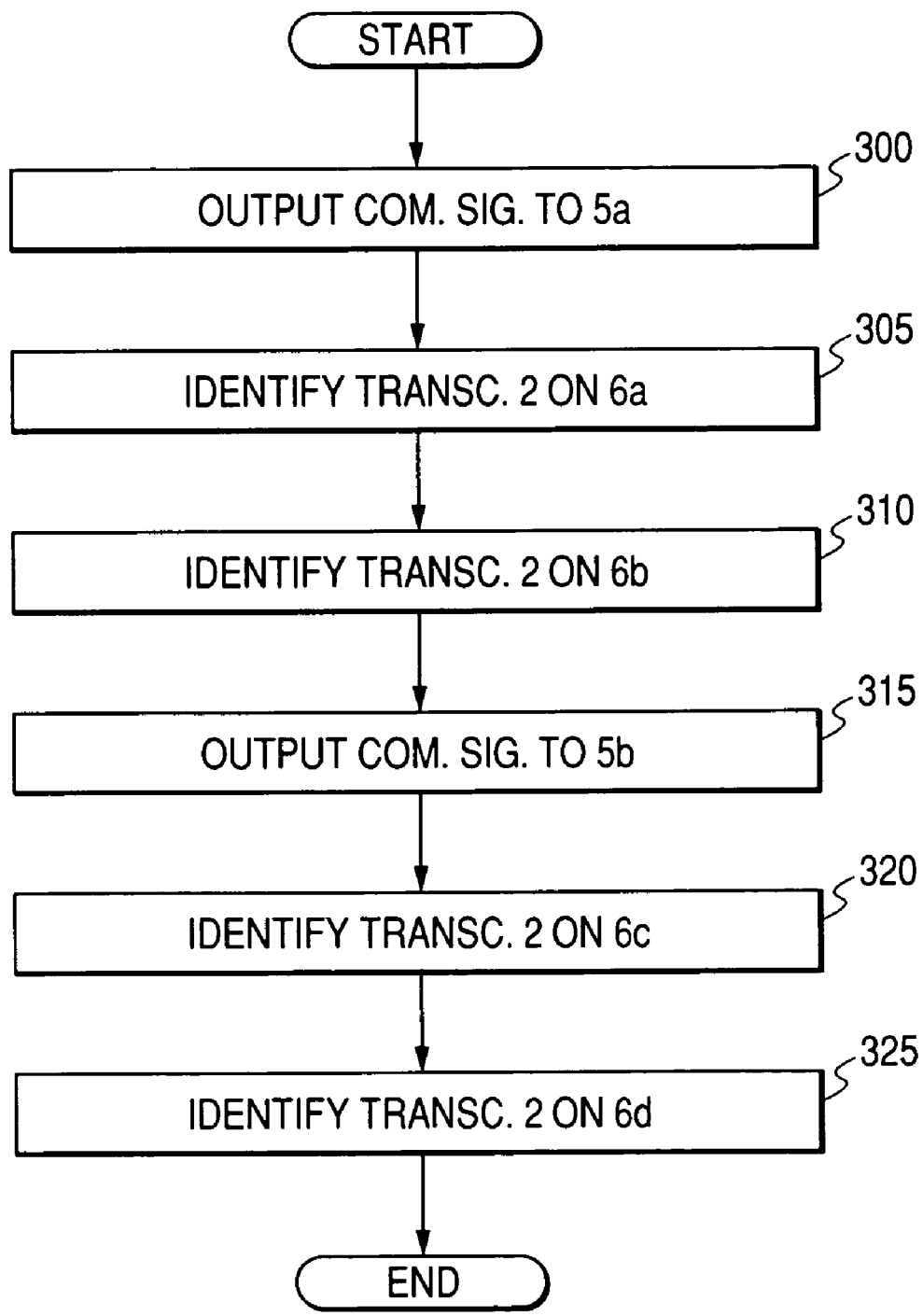
FIG. 18 is a flow chart showing a process of a receiver of the tire inflation pressure detecting apparatus according to the sixth embodiment of the invention.

Then, the receiver 3 outputs the command signal to the triggering device 5a, as indicated at the step 300 in FIG. 18.

In response to receipt of the command signal, the triggering device 5a consecutively transmits the trigger signal and the continuous carrier with predetermined strength.

Figure 19:
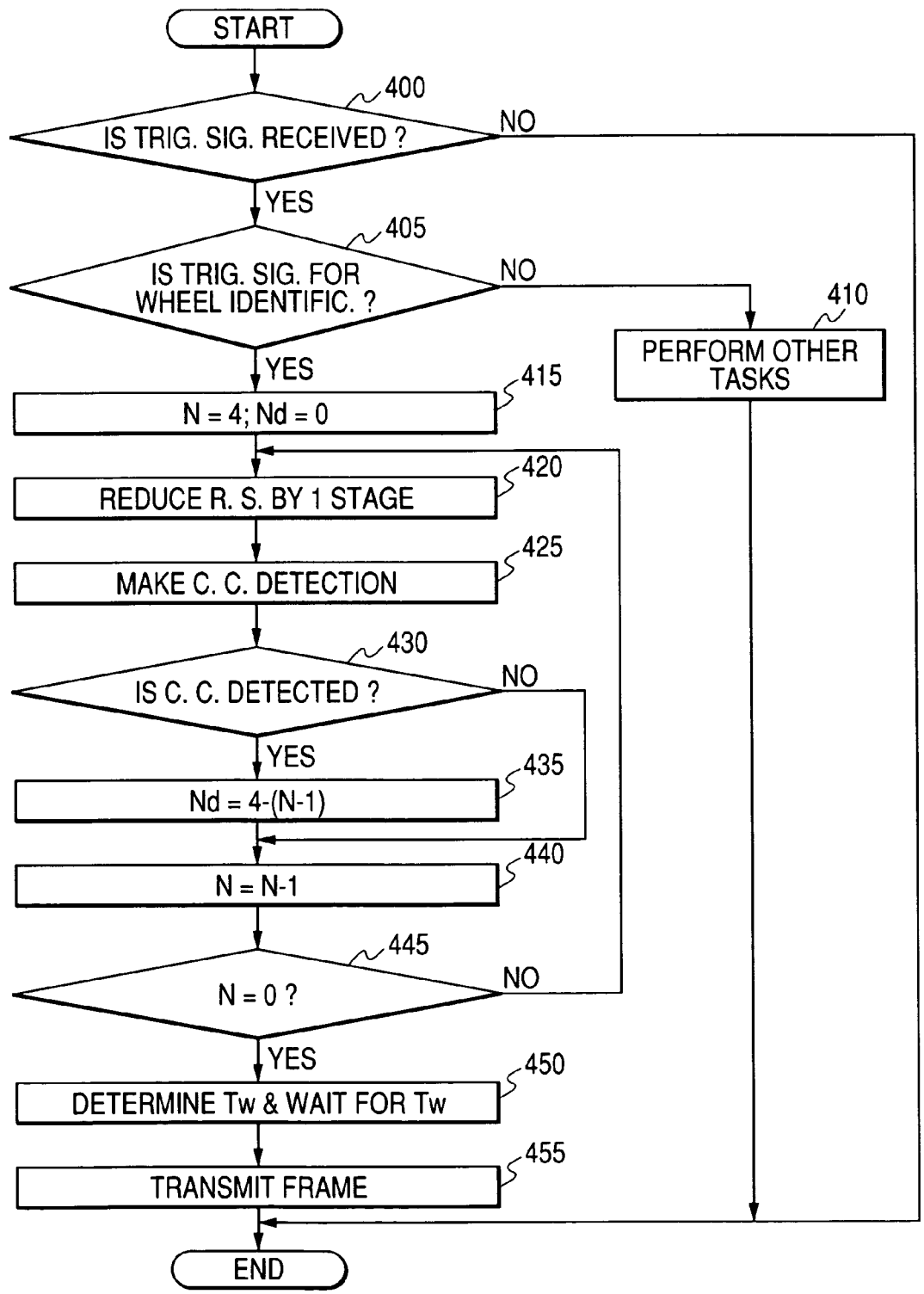
FIG. 19 is a flow chart showing a process of each of the transceivers of the tire inflation pressure detecting apparatus according to the sixth embodiment of the invention.

On the other hand, each of the transceivers 2 makes a check on whether the trigger signal is received thereby, as indicated at the step 400 of FIG. 19.

If the check at the step 400 results in a "NO" answer, then the process directly goes to the end.

Otherwise, if the check at the step 400 results in a "YES" answer, then the process proceeds to the step 405.

Since the receiver sensitivity of each of the transceivers 2 has the maximum value at this stage, the trigger signal that is transmitted by the triggering device 5a with the predetermined strength is received by both the transceivers 2 on the front wheels 6a and 6b, and thus the processes in those transceivers 2 proceed to the step 405.

At the step 405, a determination is made as to whether the received trigger signal indicates an instruction for wheel identification.

If the determination at the step 405 results in a "NO" answer, then the process goes to the step 410.

At the step 410, a predetermined task is performed according to the instruction; the process then goes to the end.

Otherwise, if the determination at the step 405 results in a "YES" answer, then the process proceeds to the step 415.

At the step 415, a parameter N is set to 4 and a parameter Nd is set to 0 (zero). Here, the parameter N is set to be equal to the number of stages of the change in the receiver sensitivity. The parameter Nd represents the number of times the continuous carrier is detected during the change in the receiver sensitivity.

At the step 420, the receiver sensitivity of each of the transceivers 2 is reduced by one stage.

Specifically, the controlling unit 22a of each of the transceivers 2 outputs the sensitivity-down command signal to the receiving antenna 25, which causes one of the receiver sensitivity switches 25b to be turned from off to on, thereby bring a corresponding one of the damping resistors 25c into parallel electrical connection with the antenna element 25a.

At the step 425, each of the transceivers 2 makes a detection of the continuous carrier that is transmitted consecutively following the trigger signal.

At the step 430, each of the transceivers 2 checks whether the continuous carrier is detected thereby.

If the check at the step 430 results in a "YES" answer, then the process proceeds to the step 435.

At the step 435, the parameter Nd is set to $(4-(N-1))$; the process then proceeds to the step 440.

Otherwise, if the check at the step 430 results in a "NO" answer, then the process directly goes to the step 440, without changing the value of the parameter Nd.

At the step 440, the parameter N is reduced by 1.

At the step 445, a check is made on whether the parameter N is equal to 0 (zero).

If the check at the step 445 results in a "NO" answer, then the process returns to the step 420.

Otherwise, if the check at the step 445 results in a "YES" answer, then the process proceeds to the step 450.

Through repeatedly performing the above steps 420-445, the receiver sensitivity of each of the transceivers 2 is decreased from the maximum value to the minimum value in four stages, and the number of times the continuous carrier is detected by each of the transceivers 2 during the change in the receiver sensitivity (i.e., Nd) is determined.

At the step 450, each of the transceivers 2 determines a waiting time Tw and waits for the determined waiting time Tw. Here, the waiting time Tw is determined by the following equation:

$$Tw=((4-Nd))\times Tr$$

where Tr is a time required for the transceivers 2 to complete one frame transmission.

After waiting for Tw, at the step 455, each of the transceivers 2 transmits the frame which contains ID information indicative of the identification of the transceiver 2. Then, the process goes to the end.

Through performing the above steps 450 and 455, the transceivers 2 on the front wheels 6a and 6b transmit the respective frames at different transmission times. Specifically, since the triggering device 5a is located closer to the FR wheel 6a than the FL wheel 6b, the strength of the continuous carrier at the transceiver 2 on the FR wheel 6a is higher than that at the transceiver 2 on the FL wheel 6b. Accordingly, Nd for the transceiver 2 on the FR wheel 6a is greater than that for the transceiver 2 on the FL wheel 6b, and Tw for the transceiver 2 on the FR wheel 6a is thus shorter than that for the transceiver 2 on the FL wheel 6b.

Consequently, the transmission time for the transceiver 2 on the FR wheel 6a is earlier than that for the transceiver 2 on the FL wheel 6b; thus the receiver 3 will receive the frame transmitted by the transceiver 2 on the FR wheel 6a first and then receive the frame transmitted by the transceiver 2 on the FL wheel 6b.

Turning back to FIG. 18, at the step 305, the receiver 3 first receives one of the frames transmitted by the transceivers 2 on the front wheels 6a and 6b and identifies the transceiver 2 having transmitted the first received frame as being mounted on the FR wheel 6a. Then, the receiver 3 stores in the memory thereof the ID information contained in the first received frame as reference ID information associated with the FR wheel 6a.

At the step 310, the receiver 3 secondly receives the other of the frames transmitted by the transceivers 2 on the front wheels 6a and 6b and identifies the transceiver 2 having transmitted the secondly received frame as being mounted on the FL wheel 6b. Then, the receiver 3 stores in the memory thereof the ID information contained in the secondly received frame as reference ID information associated with the FL wheel 6b.

At the succeeding step 315, the receiver 3 outputs the command signal to the triggering device 5b.

In response to receipt of the command signal, the triggering device 5b consecutively transmits the trigger signal and the continuous carrier with predetermined strength.

Upon receipt of the trigger signal transmitted by the triggering device 5b, the transceivers 2 on the rear wheels 6c and 6d perform, as the transceivers 2 on the front wheels 6a and 6b, the process indicated in FIG. 19. Consequently, the transceivers 2 on the rear wheels 6c and 6d transmit the respective frames at different transmission times.

Then, as indicated at the step 320 of FIG. 18, the receiver 3 thirdly receives one of the frames transmitted by the transceivers 2 on the rear wheels 6c and 6d and identifies the transceiver 2 having transmitted the thirdly received frame as being mounted on the RR wheel 6c. Thereafter, the receiver 3 stores in the memory thereof the ID information contained in the thirdly received frame as reference ID information associated with the RR wheel 6c.

At the step 325, the receiver 3 fourthly receives the other of the frames transmitted by the transceivers 2 on the rear wheels 6c and 6d and identifies the transceiver 2 having transmitted the fourthly received frame as being mounted on the RL wheel 6d. Then, the receiver 3 stores in the memory thereof the ID information contained in the fourthly received frame as reference ID information associated with the RL wheel 6d.

After the step 325, the wheel identification process of the receiver 3 goes to the end.

Then, the operation of the tire inflation pressure detecting apparatus S6 is shifted from the ID registration mode to the tire pressure detection mode.

The tire pressure detection mode of the tire inflation pressure detecting apparatus S6 is the same as that of the tire inflation pressure detecting apparatus S5; therefore, the description thereof is omitted here.

The above-described wheel identification process according to the present embodiment may be understood more fully from FIG. 20, in which only the wheel identification for the transceivers 2 on the front wheels 6a and 6b is illustrated.

As shown in FIG. 20, the triggering device 5a consecutively transmits the trigger signal and the continuous carrier.

Then, both the transceivers 2 on the front wheels 6a and 6b receive the trigger signal and change the receiver sensitivity (R. S.) thereof in four stages in response to receipt of the trigger signal. At each stage of the change in the receiver sensitivity, each transceiver 2 checks whether the continuous carrier is detected thereby and counts the number of times the continuous carrier is detected (i.e., Nd).

Since the triggering device 5a is located closer to the FR wheel 6a than the FL wheel 6b, Nd for the transceiver 2 on the FR wheel 6a is, for example, four, while Nd for the transceiver 2 on the FL wheel 6b is, for example, one. Thus, the waiting time Tw for the transceiver 2 on the FR wheel 6a is set to be shorter than that for the transceiver 2 on the FL wheel 6b.

Consequently, the transceivers 2 transmit the respective frames at different transmission times, so that the receiver 3 receives the frames at different reception times and identify, for each of the received frames, the wheel on which the transceiver 2 having transmitted the frame is mounted based on the reception time at which the frame is received.

The tire inflation pressure detecting apparatus S6 according to the present embodiment has the same advantages as the tire inflation pressure detecting apparatus S5 according to the previous embodiment.

In addition, the above-described configuration of the tire inflation pressure detecting apparatus S6 may be modified such that: the transceivers 2 transmit the respective frames which contain receiving behavior information indicative of the number of times the continuous carrier is detected; the receiver 3 identifies, for each of the frames received thereby, the wheel on which the transceiver 2 having transmitted the frame is mounted based on the receiving behavior information contained in the frame.

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments, the receiver 3 includes only the single receiving antenna 31 to receive all the frames transmitted by the transceivers 2.

However, the receiver 3 may also have a different number of receiving antennas 31. For example, the receiver 3 may include four receiving antennas 31, each of which corresponds to one of the four transceivers 2. It is to be appreciated that the present invention is especially effective in case that the receiver 3 includes only the single receiving antenna 31 and thus it is difficult for the receiver 3 to distinguish the frames received via the common receiving antenna 31 from one another.

In the previous embodiments of the invention, each of the frames transmitted by the transceivers 2 contains the ID information indicative of the identification of the transceiver 2 having transmitted the frame.

However, in addition to such ID information, each of the frames transmitted by the transceivers 2 may also contain vehicle ID information indicative of the identification of the vehicle 1. In this case, it is still possible to automatically perform the registration task of all the ID information according to the present invention.

In the third embodiment of the invention, the triggering devices 5a and 5b are arranged on the same side of the longitudinal centerline of the vehicle 1.

However, the triggering devices 5a and 5b may also be arranged on the same side of the lateral centerline of the vehicle 1. For example, the triggering device 5b may be arranged in close vicinity to the RR wheel 6c, while the triggering device 5a is arranged in close vicinity to the RL wheel 6d. In this case, it is still possible for the receiver 3 to accurately determine the locations of the transceivers 2 and thus those of the associated tires in the same way as in the third embodiment.

In the fifth and sixth embodiments of the invention, the triggering device 5a is employed for the wheel identification for the transceivers 2 on the front wheels 6a and 6b, while the triggering device 5b is employed for the wheel identification for the transceivers 2 on the rear wheels 6c and 6d.

However, the triggering device 5a may be located in the vicinity of the right wheels 6a and 6c at different distances from the FR wheel 6a and the RR wheel 6c for the wheel identification for the transceivers 2 on the right wheels 6a and 6c, and the triggering device 5b may be located in the vicinity of the left wheels 6b and 6d at different distances from the FL wheel 6b and the RL wheel 6d for the wheel identification for the transceivers 2 on the left wheels 6b and 6d.

Further, in the sixth embodiment of the invention, a single triggering device may be employed for the wheel identification for all the transceivers 2 on the wheels 6a-6d. In this case, it is necessary that the single triggering device is located at different distances from all the transceivers 2 and at least three of the transceivers 2 can receive the trigger signal transmitted by the triggering device and transmit the frame in response to receipt of the trigger signal.

In the fifth and sixth embodiments of the invention, the variable receiver sensitivities of the transceivers 2 are obtained by employing the damping resistors 25.

However, instead of employing the damping resistors 25, an amplifier may be employed in the receiving unit 22c of each of the transceivers 2, and the receiver sensitivity of each of the transceivers 2 may be varied through varying the gain of the amplifier.

In the fifth and sixth embodiments of the invention, the transceivers 2 transmit the respective frames only once in the ID registration mode.

However, the transceivers 2 may repeatedly transmit the respective frames a plurality of times at different time intervals in the ID registration mode. Further, all the frames transmitted by transceivers 2 may contain the same size of data. As a result, the receiver 3 may more reliably receive the frames transmitted by the transceivers 2 without interference of the frames thereat.

Such modifications, changes, and improvements within the skill of the art are possible within the scope of the appended claims.

What is claimed is:

1. A wheel identifying apparatus comprising:
   a first and a second transceiver which are respectively located on a first and a second wheel of a vehicle, each of the transceivers working to receive a trigger signal and transmit a response signal in response to receipt of the trigger signal;
   a triggering device working to transmit the trigger signal, the triggering device being located on a body of the vehicle at different distances from the transceivers, so that strengths of the trigger signal at the transceivers are different from each other;
   a receiver working to receive the response signals transmitted by the transceivers; and
   a wheel identifier operatively connected to the receiver, the wheel identifier working to identify, for each of the response signals received by the receiver, the wheel on which the transceiver having transmitted the response signal is located,
   wherein,
   upon receipt of the trigger signal transmitted by the triggering device, each of the transceivers determines the strength of the trigger signal thereat and transmits the response signal which conveys signal strength information indicative of the determined strength of the trigger signal, and
   the wheel identifier identifies, for each of the response signals received by the receiver, the wheel on which the transceiver having transmitted the response signal is located based on the signal strength information conveyed by the response signal.

2. The wheel identifying apparatus as set forth in claim 1, wherein,
   the triggering device outputs the trigger signal with such a low strength that one of the first and second transceivers cannot detect the trigger signal and thus no response signal is transmitted by the one of the first and second transceivers, and
   the wheel identifier identifies the wheel on which the one of the first and second transceivers is located as the one of the first and second wheels which is farther from the triggering device than the other.

3. The wheel identifying apparatus as set forth in claim 1, wherein,
   each of the transceivers has an identification specific thereto and transmits, in response to receipt of the trigger signal transmitted by the triggering device, the response signal which conveys ID information indicative of the identification of the transceiver as well as the signal strength information, and
   after the wheel identification for each of the response signals received by the receiver, the wheel identifier further stores the ID information conveyed by the response signal as reference ID information associated with the identified wheel.

4. The wheel identifying apparatus as set forth in claim 1, further comprising a third and a fourth transceiver, which are respectively located on a third and a fourth wheel of the vehicle and have the same configuration as the first and second transceivers, and another triggering device that is located on the body of the vehicle at different distances from the third and fourth transceivers and has the same configuration as the triggering device, wherein,
   the triggering device is a first triggering device and the another triggering device is a second triggering device,
   the first and second wheels are rear wheels of the vehicle and the third and fourth wheels are front wheels of the vehicle,
   the first triggering device is located closer to the first and second transceivers than the third and fourth transceivers, and the second triggering device is located closer to the third and fourth transceivers than the first and second transceivers,
   when the first triggering device transmits the trigger signal, at least the first and second transceivers receive the trigger signal and transmit the respective response signals in response to receipt of the trigger signal, and
   when the second triggering device transmits the trigger signal, at least the third and fourth transceivers receive the trigger signal and transmit the respective response signals in response to receipt of the trigger signal.

5. The wheel identifying apparatus as set forth in claim 4, wherein the first and second triggering devices are located on the same side of a longitudinal centerline of the vehicle.

6. The wheel identifying apparatus as set forth in claim 5, wherein,
   the first triggering device transmits the trigger signal,
   at least the first and second transceivers transmit the respective response signals in response to receipt of the trigger signal transmitted by the first triggering device,
   the wheel identifier identifies the one of the first and second transceivers, which transmits the response signal conveying signal strength information indicative of the maximum one of the strengths of the trigger signal transmitted by the first triggering device at the transceivers, as being located on the one of the rear wheels of the vehicle which is closer to the first triggering device than the other,
   the second triggering device transmits the trigger signal, at least the third and fourth transceivers transmit the respective response signals in response to receipt of the trigger signal transmitted by the second triggering device, the wheel identifier identifies the one of the third and fourth transceivers, which transmits the response signal conveying signal strength information indicative of the maximum one of the strengths of the trigger signal transmitted by the second triggering device at the transceivers, as being located on the one of the front wheels of the vehicle which is closer to the second triggering device than the other, and the wheel identifier identifies, based on all the response signals received by the receiver, the other one of the first and second transceivers as being located on the other one of the rear wheels of the vehicle and the other one of the third and fourth transceivers as being located on the other one of the front wheels of the vehicle.

7. The wheel identifying apparatus as set forth in claim 1, further comprising a third and a fourth transceiver, which are respectively located on a third and a fourth wheel of the vehicle and have the same configuration as the first and second transceivers, and another triggering device that is located on the body of the vehicle at different distances from the third and fourth transceivers and has the same configuration as the triggering device, wherein, the triggering device is a first triggering device and the another triggering device is a second triggering device, the first and second wheels are left wheels of the vehicle and the third and fourth wheels are right wheels of the vehicle, the first triggering device is located closer to the first and second transceivers than the third and fourth transceivers, and the second triggering device is located closer to the third and fourth transceivers than the first and second transceivers, when the first triggering device transmits the trigger signal, at least the first and second transceivers receive the trigger signal and transmit the respective response signals in response to receipt of the trigger signal, and when the second triggering device transmits the trigger signal, at least the third and fourth transceivers receive the trigger signal and transmit the respective response signals in response to receipt of the trigger signal.

8. The wheel identifying apparatus as set forth in claim 7, wherein the first and second triggering devices are located on the same side of a lateral centerline of the vehicle.

9. The wheel identifying apparatus as set forth in claim 8, wherein, the first triggering device transmits the trigger signal, at least the first and second transceivers transmit the respective response signals in response to receipt of the trigger signal transmitted by the first triggering device, the wheel identifier identifies the one of the first and second transceivers, which transmits the response signal conveying signal strength information indicative of the maximum one of the strengths of the trigger signal transmitted by the first triggering device at the transceivers, as being located on the one of the left wheels of the vehicle which is closer to the first triggering device than the other, the second triggering device transmits the trigger signal, at least the third and fourth transceivers transmit the respective response signals in response to receipt of the trigger signal transmitted by the second triggering device, the wheel identifier identifies the one of the third and fourth transceivers, which transmits the response signal conveying signal strength information indicative of the maximum one of the strengths of the trigger signal transmitted by the second triggering device at the transceivers, as being located on the one of the right wheels of the vehicle which is closer to the second triggering device than the other, and the wheel identifier identifies, based on all the response signals received by the receiver, the other one of the first and second transceivers as being located on the other one of the left wheels of the vehicle and the other one of the third and fourth transceivers as being located on the other one of the right wheels of the vehicle.

10. The wheel identifying apparatus as set forth in claim 1, wherein upon receipt of the trigger signal transmitted by the triggering device, the transceivers transmit the respective response signals at different transmission times.

11. The wheel identifying apparatus as set forth in claim 10, wherein the transmission times, at which the response signals are transmitted, are determined by the respective transceivers according to the strengths of the trigger signal thereat.

12. The wheel identifying apparatus as set forth in claim 10, wherein the transmission times, at which the response signals are transmitted, are randomly determined by the respective transceivers.

13. A tire inflation pressure detecting apparatus comprising:

a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;

a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers;

a wheel identifier operatively connected to the receiver, the wheel identifier working to identify, for each of the response signals received by the receiver, the wheel on which the transceiver having transmitted the response signal is located; and a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal, wherein, upon receipt of the trigger signal transmitted by the triggering device, each of the transceivers determines the strength of the trigger signal thereat and transmits the response signal which conveys signal strength information indicative of the determined strength of the trigger signal as well as the tire pressure information, and the wheel identifier identifies, for each of the response signals received by the receiver, the wheel on which the transceiver having transmitted the response signal is located based on the signal strength information conveyed by the response signal.

14. A wheel identifying apparatus comprising:
a first and a second transceiver which are respectively located on a first and a second wheel of a vehicle, each of the transceivers working to receive a trigger signal and transmit a response signal in response to receipt of the trigger signal;
a triggering device working to transmit the trigger signal, the triggering device being located on a body of the vehicle at different distances from the transceivers, so that strengths of the trigger signal at the transceivers are different from each other;
a receiver working to receive the response signals transmitted by the transceivers; and
a wheel identifier operatively connected to the receiver, the wheel identifier working to identify, for each of the response signals received by the receiver, the wheel on which the transceiver having transmitted the response signal is located,
wherein,
upon receipt of the trigger signal transmitted by the triggering device, each of the transceivers determines the strength of the trigger signal thereat, determines a transmission time according to the determined strength of the trigger signal, and transmits the response signal at the determined transmission time,
the receiver receives the response signals transmitted by the transceivers at different reception times, and
the wheel identifier identifies, for each of the response signals received by the receiver, the wheel on which the transceiver having transmitted the response signal is located based on the reception time at which the response signal is received by the receiver.

15. The wheel identifying apparatus as set forth in claim 14, wherein,
the triggering device outputs the trigger signal with such a low strength that one of the first and second transceivers cannot detect the trigger signal and thus no response signal is transmitted by the one of the first and second transceivers, and
the wheel identifier identifies the wheel on which the one of the first and second transceivers is located as the one of the first and second wheels which is farther from the triggering device than the other.

16. The wheel identifying apparatus as set forth in claim 14, wherein,
each of the transceivers has an identification specific thereto and transmits, in response to receipt of the trigger signal transmitted by the triggering device, the response signal which conveys ID information indicative of the identification of the transceiver, and
after the wheel identification for each of the response signals received by the receiver, the wheel identifier further stores the ID information conveyed by the response signal as reference ID information associated with the identified wheel.

17. The wheel identifying apparatus as set forth in claim 14, further comprising a third and a fourth transceiver, which are respectively located on a third and a fourth wheel of the vehicle and have the same configuration as the first and second transceivers, and another triggering device that is located on the body of the vehicle at different distances from the third and fourth transceivers and has the same configuration as the triggering device, wherein,
the triggering device is a first triggering device and the another triggering device is a second triggering device,
the first and second wheels are rear wheels of the vehicle and the third and fourth wheels are front wheels of the vehicle,
the first triggering device is located closer to the first and second transceivers than the third and fourth transceivers, and the second triggering device is located closer to the third and fourth transceivers than the first and second transceivers,
when the first triggering device transmits the trigger signal, at least the first and second transceivers receive the trigger signal and transmit the respective response signals in response to receipt of the trigger signal, and
when the second triggering device transmits the trigger signal, at least the third and fourth transceivers receive the trigger signal and transmit the respective response signals in response to receipt of the trigger signal.

18. The wheel identifying apparatus as set forth in claim 14, further comprising a third and a fourth transceiver, which are respectively located on a third and a fourth wheel of the vehicle and have the same configuration as the first and second transceivers, and another triggering device that is located on the body of the vehicle at different distances from the third and fourth transceivers and has the same configuration as the triggering device, wherein,
the triggering device is a first triggering device and the another triggering device is a second triggering device,
the first and second wheels are left wheels of the vehicle and the third and fourth wheels are right wheels of the vehicle,
the first triggering device is located closer to the first and second transceivers than the third and fourth transceivers, and the second triggering device is located closer to the third and fourth transceivers than the first and second transceivers,
when the first triggering device transmits the trigger signal, at least the first and second transceivers receive the trigger signal and transmit the respective response signals in response to receipt of the trigger signal, and
when the second triggering device transmits the trigger signal, at least the third and fourth transceivers receive the trigger signal and transmit the respective response signals in response to receipt of the trigger signal.

19. A tire inflation pressure detecting apparatus comprising:
a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;
a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;
a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers;

a wheel identifier operatively connected to the receiver, the wheel identifier working to identify, for each of the response signals received by the receiver, the wheel on which the transceiver having transmitted the response signal is located; and a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal, wherein, upon receipt of the trigger signal transmitted by the triggering device, each of the transceivers determines the strength of the trigger signal thereat, determines a transmission time according to the determined strength of the trigger signal, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

20. A wheel identifying apparatus comprising:

a first and a second transceiver which are respectively located on a first and a second wheel of a vehicle, each of the transceivers working to receive a trigger signal and transmit a response signal in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers; and a wheel identifier operatively connected to the receiver, the wheel identifier working to identify, for each of the response signals received by the receiver, the wheel on which the transceiver having transmitted the response signal is located, wherein, each of the transceivers has a variable receiver sensitivity and receives the trigger signal transmitted by the triggering device with a higher value of the receiver sensitivity, in response to receipt of the trigger signal, each of the transceivers changes the receiver sensitivity thereof from the higher value to a lower value, after transmission of the trigger signal, the triggering device further transmits a check signal, each of the transceivers determines a receiving behavior thereof in reception of the check signal with the lower value of the receiver sensitivity, each of the transceivers transmits the response signal which conveys receiving behavior information indicative of the determined receiving behavior, and the wheel identifier identifies, for each of the response signals received by the receiver, the wheel on which the transceiver having transmitted the response signal is located based on the receiving behavior information conveyed by the response signal.

21. The wheel identifying apparatus as set forth in claim 20, wherein, after a first predetermined time period from transmission of the trigger signal, the triggering device transmits the check signal, after a second predetermined time period from receipt of the trigger signal, each of the transceivers checks whether the check signal is received thereby with the lower value of the receiver sensitivity thereof, and the receiving behavior information for each of the transceivers indicates the result of the check on whether the check signal is received by the transceiver with the lower value of the receiver sensitivity.

22. The wheel identifying apparatus as set forth in claim 20, wherein, the check signal is a continuous carrier which is transmitted by the triggering device consecutively following the trigger signal, in response to receipt of the trigger signal, each of the transceivers changes the receiver sensitivity thereof from the higher value to the lower value in a plurality of stages, each of the transceivers determines the one of the stages from which it becomes impossible for the transceiver to detect the continuous carrier, and the receiving behavior information for each of the transceivers indicates the determined stage from which it becomes impossible for the transceiver to detect the continuous carrier.

23. The wheel identifying apparatus as set forth in claim 22, wherein, each of the transceivers makes a detection of the continuous carrier at each stage of the change in the receiver sensitivity thereof, and each of the transceivers determines the one of the stages from which it becomes impossible for the transceiver to detect the continuous carrier through determining the number of times the continuous carrier is detected by the transceiver during the change in the receiver sensitivity.

24. The wheel identifying apparatus as set forth in claim 23, further comprising a third and a fourth transceiver that are respectively located on a third and a fourth wheel of the vehicle and have the same configuration as the first and second transceivers, wherein, the triggering device is located at different distances from all the transceivers, the triggering device outputs the trigger signal with such a low strength that one of all the transceivers cannot detect the trigger signal and thus no response signal is transmitted by the one of all the transceivers, and the wheel identifier identifies the wheel on which the one of all the transceivers is located as the one of all the wheels which is farthest from the triggering device.

25. The wheel identifying apparatus as set forth in claim 20, further comprising a third and a fourth transceiver, which are respectively located on a third and a fourth wheel of the vehicle and have the same configuration as the first and second transceivers, and another triggering device that is located on the body of the vehicle at different distances from the third and fourth transceivers and has the same configuration as the triggering device, wherein, the triggering device is a first triggering device and the another triggering device is a second triggering device, the first triggering device is located closer to the first and second transceivers than the third and fourth transceivers, and the second triggering device is located closer to the third and fourth transceivers than the first and second transceivers, the first and second triggering devices transmit the respective trigger signals at different times, the first and second transceivers receive the trigger signal transmitted by the first triggering device and transmit the respective response signals in response to receipt of the trigger signal transmitted by the first triggering device, the receiver receives the response signals transmitted by the first and second transceivers, and the wheel identifier identifies, for each of the response signals transmitted from the first and second transceivers to the receiver, the wheel on which the transceiver having transmitted the response signal is located, the third and fourth transceivers receive the trigger signal transmitted by the second triggering device and transmit the respective response signals in response to receipt of the trigger signal transmitted by the second triggering device, and the receiver receives the response signals transmitted by the third and fourth transceivers, and the wheel identifier identifies, for each of the response signals transmitted from the third and fourth transceivers to the receiver, the wheel on which the transceiver having transmitted the response signal is located.

26. The wheel identifying apparatus as set forth in claim 20, wherein, the response signals transmitted by the transceivers contain the same size of data, and the transceivers repeatedly transmit the respective response signals a plurality of times at different time intervals.

27. A tire inflation pressure detecting apparatus comprising:

a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;

a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers;

a wheel identifier operatively connected to the receiver, the wheel identifier working to identify, for each of the response signals received by the receiver, the wheel on which the transceiver having transmitted the response signal is located; and a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal, wherein, each of the transceivers has a variable receiver sensitivity and receives the trigger signal transmitted by the triggering device with a higher value of the receiver sensitivity, in response to receipt of the trigger signal, each of the transceivers changes the receiver sensitivity thereof from the higher value to a lower value, after transmission of the trigger signal, the triggering device further transmits a check signal, each of the transceivers determines a receiving behavior thereof in reception of the check signal with the lower value of the receiver sensitivity, each of the transceivers transmits the response signal which conveys receiving behavior information indicative of the determined receiving behavior as well as the tire pressure information, and the wheel identifier identifies, for each of the response signals received by the receiver, the wheel on which the transceiver having transmitted the response signal is located based on the receiving behavior information conveyed by the response signal.

28. A wheel identifying apparatus comprising:

a first and a second transceiver which are respectively located on a first and a second wheel of a vehicle, each of the transceivers working to receive a trigger signal and transmit a response signal in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers; and a wheel identifier operatively connected to the receiver, the wheel identifier working to identify, for each of the response signals received by the receiver, the wheel on which the transceiver having transmitted the response signal is located, wherein, each of the transceivers has a variable receiver sensitivity and receives the trigger signal transmitted by the triggering device with a higher value of the receiver sensitivity, in response to receipt of the trigger signal, each of the transceivers changes the receiver sensitivity thereof from the higher value to a lower value, after transmission of the trigger signal, the triggering device further transmits a check signal, each of the transceivers determines a receiving behavior thereof in reception of the check signal with the lower value of the receiver sensitivity, each of the transceivers determines a transmission time according to the determined receiving behavior and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

29. The wheel identifying apparatus as set forth in claim 28, wherein, after a first predetermined time period from transmission of the trigger signal, the triggering device transmits the check signal, after a second predetermined time period from receipt of the trigger signal, each of the transceivers checks whether the check signal is received thereby with the lower value of the receiver sensitivity thereof, and each of the transceivers determines the transmission time according to the result of the check on whether the check signal is received by the transceiver with the lower value of the receiver sensitivity.

30. The wheel identifying apparatus as set forth in claim 28, wherein, the check signal is a continuous carrier which is transmitted by the triggering device consecutively following the trigger signal, in response to receipt of the trigger signal, each of the transceivers changes the receiver sensitivity thereof from the higher value to the lower value in a plurality of stages, each of the transceivers determines the one of the stages from which it becomes impossible for the transceiver to detect the continuous carrier, and each of the transceivers determines the transmission time according to the determined stage from which it becomes impossible for the transceiver to detect the continuous carrier.

31. The wheel identifying apparatus as set forth in claim 30, wherein, each of the transceivers makes a detection of the continuous carrier at each stage of the change in the receiver sensitivity thereof, and each of the transceivers determines the one of the stages from which it becomes impossible for the transceiver to detect the continuous carrier through determining the number of times the continuous carrier is detected by the transceiver during the change in the receiver sensitivity.

32. The wheel identifying apparatus as set forth in claim 31, further comprising a third and a fourth transceiver that are respectively located on a third and a fourth wheel of the vehicle and have the same configuration as the first and second transceivers, wherein, the triggering device is located at different distances from all the transceivers, the triggering device outputs the trigger signal with such a low strength that one of all the transceivers cannot detect the trigger signal and thus no response signal is transmitted by the one of all the transceivers, and the wheel identifier identifies the wheel on which the one of all the transceivers is located as the one of all the wheels which is farthest from the triggering device.

33. The wheel identifying apparatus as set forth in claim 28, further comprising a third and a fourth transceiver, which are respectively located on a third and a fourth wheel of the vehicle and have the same configuration as the first and second transceivers, and another triggering device that is located on the body of the vehicle at different distances from the third and fourth transceivers and has the same configuration as the triggering device, wherein, the triggering device is a first triggering device and the another triggering device is a second triggering device, the first triggering device is located closer to the first and second transceivers than the third and fourth transceivers, and the second triggering device is located closer to the third and fourth transceivers than the first and second transceivers, the first and second triggering devices transmit the respective trigger signals at different times, the first and second transceivers receive the trigger signal transmitted by the first triggering device and transmit the respective response signals in response to receipt of the trigger signal transmitted by the first triggering device, the receiver receives the response signals transmitted by the first and second transceivers, and the wheel identifier identifies, for each of the response signals transmitted from the first and second transceivers to the receiver, the wheel on which the transceiver having transmitted the response signal is located, the third and fourth transceivers receive the trigger signal transmitted by the second triggering device and transmit the respective response signals in response to receipt of the trigger signal transmitted by the second triggering device, and the receiver receives the response signals transmitted by the third and fourth transceivers, and the wheel identifier identifies, for each of the response signals transmitted from the third and fourth transceivers to the receiver, the wheel on which the transceiver having transmitted the response signal is located.

34. The wheel identifying apparatus as set forth in claim 28, wherein, the response signals transmitted by the transceivers contain the same size of data, and the transceivers repeatedly transmit the respective response signals a plurality of times at different time intervals.

35. A tire inflation pressure detecting apparatus comprising:

a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;

a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers;

a wheel identifier operatively connected to the receiver, the wheel identifier working to identify, for each of the response signals received by the receiver, the wheel on which the transceiver having transmitted the response signal is located; and a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal, wherein, each of the transceivers has a variable receiver sensitivity and receives the trigger signal transmitted by the triggering device with a higher value of the receiver sensitivity, in response to receipt of the trigger signal, each of the transceivers changes the receiver sensitivity thereof from the higher value to a lower value, after transmission of the trigger signal, the triggering device further transmits a check signal, each of the transceivers determines a receiving behavior thereof in reception of the check signal with the lower value of the receiver sensitivity, each of the transceivers determines a transmission time according to the determined receiving behavior and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

* * * * *